: 
United States Patent [19]
Rando et al.

[11] Patent Number: 5,459,932
[45] Date of Patent: Oct. 24, 1995

[54] AUTOMATIC LEVEL AND PLUMB TOOL

[75] Inventors: Joseph F. Rando, Los Altos Hills; Christiaan Ligtenberg, Mountain View, both of Calif.

[73] Assignee: LeveLite Technology, Inc., Mountain View, Calif.

[21] Appl. No.: 248,517

[22] Filed: May 24, 1994

Related U.S. Application Data

[63] Continuation-in-part of Ser. No. 178,039, Jan. 6, 1994, abandoned, which is a continuation-in-part of Ser. No. 113,773, Aug. 27, 1993, abandoned.

[51] Int. Cl.$^6$ .......................... G01B 11/26; G01C 9/12; G12B 5/00
[52] U.S. Cl. ..................... 33/291; 356/149; 356/250; 33/DIG. 21
[58] Field of Search .................. 33/276, 277, 283, 33/285, 291, DIG. 21; 356/250, 248, 149, 138

[56] References Cited

U.S. PATENT DOCUMENTS

| | | |
|---|---|---|
| 2,460,836 | 2/1949 | Lovins . |
| 3,684,381 | 8/1972 | Zoot . |
| 3,771,876 | 11/1973 | Ljungdahl et al. . |
| 3,807,869 | 4/1974 | Hartley ........................ 33/291 |
| 3,856,409 | 12/1974 | Cindrich et al. .............. 33/291 |
| 3,897,637 | 8/1975 | Genho . |
| 3,936,197 | 2/1976 | Aldrink et al. ............... 356/250 |
| 4,043,679 | 8/1977 | George et al. . |
| 4,062,634 | 12/1977 | Kado et al. .................. 356/248 |
| 4,111,564 | 9/1978 | Trice, Jr. . |
| 4,119,382 | 10/1978 | George et al. . |
| 4,183,667 | 1/1980 | Denton ........................ 356/250 |
| 4,221,483 | 9/1980 | Rando . |
| 4,333,242 | 6/1982 | Genho, Sr. . |
| 4,448,528 | 5/1984 | McManis ...................... 356/250 |
| 4,679,937 | 7/1987 | Cain et al. . |
| 4,767,208 | 8/1988 | Cain et al. . |
| 4,781,457 | 11/1988 | Hirano et al. ................ 356/250 |
| 4,852,265 | 8/1989 | Rando et al. . |
| 4,854,704 | 8/1989 | Funazaki ...................... 356/250 |
| 4,912,851 | 4/1990 | Rando et al. . |
| 4,993,161 | 2/1991 | Borkovitz .................... 33/291 |
| 5,012,585 | 5/1991 | DiMaggio . |
| 5,075,977 | 12/1991 | Rando . |
| 5,108,177 | 4/1992 | Middleton . |
| 5,144,486 | 9/1992 | Hart ........................... 356/138 |
| 5,144,487 | 9/1992 | Hersey . |
| 5,159,760 | 11/1992 | Spiegel et al. . |
| 5,182,863 | 2/1993 | Rando . |
| 5,184,406 | 2/1993 | Swierski . |

FOREIGN PATENT DOCUMENTS

| | | | |
|---|---|---|---|
| 0922508 | 4/1982 | U.S.S.R. ................ | 356/250 |
| 1599654 | 10/1990 | U.S.S.R. ................ | 33/285 |
| 844964 | 8/1960 | United Kingdom .... | 356/250 |

*Primary Examiner*—Thomas B. Will
*Attorney, Agent, or Firm*—Thomas M. Freiburger

[57] ABSTRACT

An automatic plumb, level and pointing tool uses a visible laser diode to project light beams in two modes through two windows. In the first mode of operation, the unit is able to project a plumb-up beam and a level beam of light while resting on a surface which is as much as five degrees out of level. In the second mode of operation the unit is able to project two orthogonal beams of light both approximately in the horizontal plane for aligning one or more reference lines. An accurate, low cost method of generating level and plumb beams and planes of light is disclosed. One method uses an approximately leveled platform combined with a weak optical correction. The approximate leveling is done using a single wire or coil spring pendulum element which allows the platform to level itself to within a small fraction of true level, and remaining correction is provided by a weak negative lens or a weak reverse telescope. In alternative embodiments, all leveling is accomplished using a very flexible coil spring as a pendulum element, or a chain link connection in combination with such a spring. Several accessories are disclosed for use with the laser tool.

30 Claims, 20 Drawing Sheets

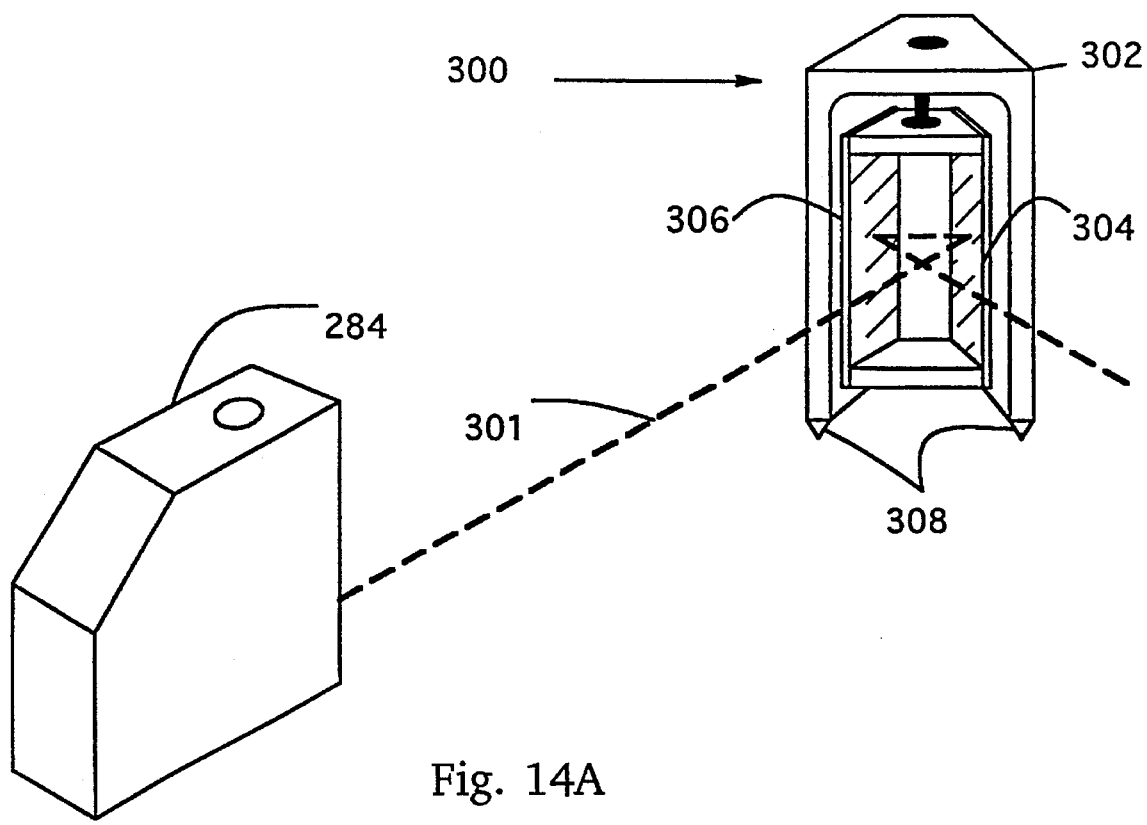
Fig. 14A
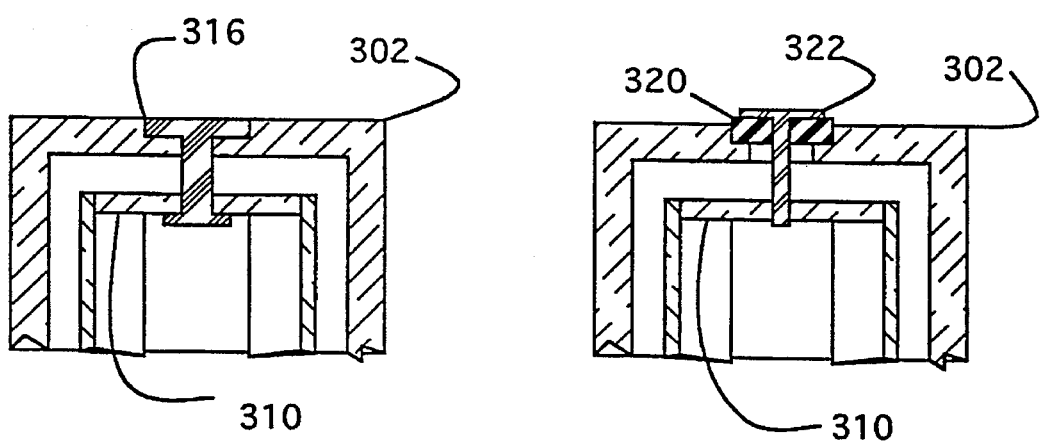
Fig. 14C
Fig. 14D

AUTOMATIC LEVEL AND PLUMB TOOL

This application is a continuation-in-part of application Ser. No. 178,039, filed Jan. 6, 1994, which was a continuation-in-part of application Ser. No. 08/113,773, filed Aug. 27, 1993, both now abandoned.

Reference to Disclosure Documents and Related Application

The subject matter of this invention was described in part in Disclosure Documents Nos. 335,444, filed Jul. 16, 1993 and 341,264, filed Oct. 12, 1993.

BACKGROUND OF THE INVENTION

This invention relates to hand tools, and in particular the invention is concerned with a compact hand tool for projecting a plumb and level beam of visible light for precise alignment. The device projects two beams simultaneously at 90 degrees to each other. When the tool is used in the upright position, the projected laser beams are level and plumb. When the tool is placed on its side in the horizontal plane the lines may be used to make a precise right angle as needed in construction applications. The leveling technique used combines the most attractive features of the existing leveling technology to produce an instrument with a wide self-leveling range, high accuracy over temperature, and low manufacturing tolerances. The unique method of leveling the level and plumb beams can be used with a mirrored cone to produce a plane of laser light for locating a plane in space.

A variety of survey and carpentry tools have previously employed lasers. The first laser alignment tools were manually leveled as in U.S. Pat. No. 3,897,637 and U.S. Pat. No. 3,279,070. Subsequently, self-leveling instruments were employed to improve accuracy and reliability. There are several methods of electronically leveling a platform on which the laser projector is mounted. Such systems use electronic level sensors to control motors which do the actual leveling. These systems are very expensive and complex.

Automatic self-leveling has been achieved using two distinctly different methods. In a first category of leveling instrument, the entire laser is leveled by gravity. In U.S. Pat. No. 3,771,876 a He—Ne laser and chassis are hung by a flexible support to create a plumb beam which is subsequently directed in the horizontal plane using a pentaprism. FIG. 1 herein shows that system, with the laser 4 hung by a wire 2 over a pentaprism 10. The pendulous oscillation is damped out by a magnet 12. The beam exits by a window 14, while the pentaprism 10 is rotated by a motor 16.

Another platform leveling system is described in U.S. Pat. No. 5,184,406 and is shown in FIG. 2a herein. A battery operated laser diode assembly 22 is mounted to a float 26 which is supported by a liquid 28 in a vessel 24. A collimated laser beam 20 remains plumb in spite of the tilt of the vessel.

A ball bearing pendulum of U.S. Pat. No. 5,144,487 is shown in FIG. 2b. A platform 23 is suspended by a ball bearing pivot 25 within a housing 29. An optical assembly within the platform generates multiple collimated laser beams 21 for alignment purposes. The platform motion is damped by eddy currents induced by a magnet 27. The use of several ball bearings makes the instrument expensive, large and of limited accuracy and ruggedness. At tilt angles close to level the force available to overcome the friction in the ball bearings is quite small, leading to inaccuracy.

In a second distinct category of laser alignment tools, the laser is rigidly mounted to the housing of the unit and a compensation means is used to correct for the tilt of the housing. In U.S. Pat. No. 3,684,381, as shown in FIG. 3 herein, a thin film of oil 36 is used to create a correcting prism which directs the downwardly directed laser beam 32 toward the plumb direction. The oil prism is formed by the upper level of the oil which is level and a lower window 38 which is tilted. The oil is contained by an upper window 34 and a housing 35. A laser source is mounted in a laser housing 30. This system is accurate only when two cells with oil of index of refraction 1.5000 are used. This system has proven inadequate because of the absence of a fluid with the desired properties over the normal temperature range. In addition the meniscus at the edges of the chamber contribute wave front errors. In the system of FIG. 3 a pentaprism 40 directs the plumb beam into the horizontal plane.

Several methods have been developed to tilt compensate a laser beam using wires. In U.S. Pat. No. 4,221,483 a pendulous lens hangs below a laser diode. As the housing is tilted the lens motion under gravity is proportional to the tilt angle which steers the laser beam to the plumb position. A pentaprism again converts the plumb beam to the horizontal plane. In U.S. Pat. Nos. 4,852,265 and 4,912,851 as shown in FIG. 4, a laser beam 41 is reflected from a mirror 43 on a platform 46 which is suspended from a single wire 44. The reflected laser beam 42 is compensated by the tilt of the platform under the force of gravity. The length and diameter of the wire are chosen so that when the housing of the unit is tilted exactly one degree, the platform tilts exactly one half of one degree. Because of the two-to-one relationship between mirror tilt and beam correction, the laser beam is restored to its plumb direction after being tilted. These patents also show laser diodes mounted on cantilevers which respond to housing tilt to correct the output beam.

A similar technique is used to produce a plane of light in U.S. Pat. No. 4,679,937 as shown in FIG. 5 herein. A plane of light can be created by reflecting a collimated beam of light from a mirrored cone as described in U.S. Pat. No. 4,111,564. The energy center of the beam is used to define the center of the optical reference plane. A collimated laser beam 54 is reflected into a plane 58 from the mirrored surface of a cone 56 suspended from a wire 60 which is supported by the housing 62. Magnets 64 provide the damping necessary for stable operation.

The laser platform leveling techniques of the first category suffer from accuracy limitations because as the platform approaches level the force available to correct for out of level decreases. In addition an expensive pentaprism is required to produce a level beam. In the wire hung platform of U.S. Pat. No. 3,771,876 (FIG. 1 herein) the error is dependent on the degree of out of level of the housing.

The wire beam techniques of the second category require a pentaprism to create a level beam or plane of light. It is a characteristic of reflection which results in inaccuracy of the 90 degree deviation when the normal vector to the mirror is out of the plane of the incident and reflected beams. As a result the pentaprism and mirrored cone reflectors have a self-leveling range of less than one half of one degree for accuracy better than 20 seconds. In addition these products bear the cost of these expensive reflectors.

An additional handicap of the instruments using tilt compensation is the need for tight tolerances in manufacturing the instruments. The requirement for a constant relationship between the platform tilt and the beam deflection defines the need for precision.

SUMMARY OF THE INVENTION

The present invention overcomes the handicaps of the two categories by combining their advantages. A pendulous wire-hung platform with a large self-leveling range and low stiffness is combined with weak tilt correction through a lens or weak reverse telescope. The laser projector and multiple beam generation optics are mounted on the platform. This platform is very close to level because of the low stiffness of the pendulum support. The small tilt dependent errors are corrected by the lenses or weak reverse telescopes mounted on the housing. In FIG. 6A a simplified version of the invention using a negative lens is shown with exaggerated angles. As can be seen from FIG. 6A, the actual tilt of the platform from level is small compared with the housing tilt. A long focal length negative lens steers the beam back to level. Note that the primary laser beam between the near-collimating lens and the correction lens is converging slightly to allow the beam to be collimated after compensation, emerging as the final laser beam from the housing.

The needed correction can be obtained using a weak reverse telescope as shown in FIG. 6B. The telescope is so short and weak that it appears as a single lens. Its image magnification is approximately 0.99 while its angle magnification in the direction used is 1.01. Both the primary beam entering the telescope and the final beam leaving the telescope are collimated. The provision of a collimated beam entering and exiting a weak telescope avoids problems of slight defocussing which will occur with a slightly converging beam corrected by a weak negative lens. It also slightly affects the degree of compensation, although it would be possible to provide a special lens which compensated for this effect. Another advantage of the use of a fully collimated beam is in avoiding any disparity in focus between the level and plumb beams. Depending on the arrangement of optics within the instrument, the plumb beam being nearer the pendulum pivot may exhibit a lesser degree of walking across the corrective weak negative lens, requiring a stronger negative lens for the plumb beam than for the level beam, for proper exit orientation of the plumb beam. This can introduce a slight focus divergence between the exiting plumb and level beams.

Consider the flexibility of the pendulum support. A support of zero stiffness always produces a level platform. A support of infinite stiffness produces no pendulum action at all. The stiffness of a pendulum with a flexible support may be described by a constant quantity, $\epsilon/\Theta$, epsilon divided by theta, where epsilon is the angle of the platform from level and theta is the housing or support tilt from level. An $\epsilon/\Theta$ equal to zero is an infinitely flexible pendulum support and a level pendulum. A pendulum with an $\epsilon/\Theta$ equal to 0.500 may be used to produce a level beam by reflecting a housing mounted laser beam from a pendulum mounted mirror. Instruments as in FIGS. 4 and 5 use this technique to produce a level beam, as shown in U.S. Pat. No. 4,912,851. In the present invention a value of epsilon over theta is approximately one half to two percent, more preferably one or two percent. In one case, the additional level correction is provided by a long focal length lens. For example when the housing is level, the pendulum is level and the beam goes through the center of the negative lens and no correction is required or provided. When the housing of FIG. 6A is one degree off level, for the case of $\epsilon/\Theta$ equal to one percent, the platform is one percent of one degree off level or 0.6 minutes off level. Since the housing is rotated one degree, the beam is now striking a different point on the negative lens. For small angles the point is R times theta in radians off the center of the lens, where R is the distance between the center of rotation of the pendulum and the lens. The focal length of the negative lens is chosen to deviate the beam the required 0.6 minutes to level. The needed relation is expressed by the relationship $R/|f|=\epsilon/\Theta$. Because only one percent of the tilt need be corrected, the tolerances for this correction are minimal. In the case of a weak reverse telescope, the angle magnification of the telescope is $1+\epsilon/\Theta$. Therefore, the lack of perfect flexibility of the support is corrected for by the reverse telescope. Conventional compensators as in FIGS. 4 and 5 using reflection of a housing mounted laser require high precision since they control the entire angle. A further understanding of the differences is to be found by considering the relative stiffness of the supporting wire in the two cases. The supporting wire in the present invention is about 80 to 100 times less stiff than a corresponding supporting wire in the second category optical compensator. The wire used in the invention acts almost as a free pendulum.

An addition advantage over housing mounted laser projectors is to be found in the lack of extreme rigidity required in the housing. In the housing mounted laser projectors any small motion of the laser projector relative to the housing and in its many mechanical connections between the housing and the compensator affect the exit beam angle directly. Such small motions are the source of many accuracy problems in the field. In the present invention mechanical connections between the housing, lens, and support structure have a greatly reduced effect on the accuracy.

Since light beams from the nearly-leveled platform are correctable to level using a lens or reverse telescope, plumb up, down, and level light beams in any direction are possible by adding beam splitters to the platform mounted laser projector. Therefore, an instrument can be built which produces many beams which are mutually orthogonal, plumb and level in several directions.

The use of a single inexpensive beam splitter in place of an expensive pentaprism is a further advantage of this invention. The calibration of the level at the factory or in the field is an important requirement for all instruments of this type. The adjustments must be easy to do, in expensive, and reliable. In the present invention, the calibration may be done by sliding the negative lens thus steering the beam. Because of the long focal length of the lens, the calibration sensitivity is low and easy to do in the factory and in the field. A sensitivity of 40 to 80 seconds per millimeter is typical and adequate. The projected laser beams can be rough aligned using weight or by bending the beam splitter support. Fine aligning is subsequently done by sliding the negative lenses, tilting the weak reverse telescope or by shifting the center of gravity. In the case of the weak reverse telescope, the telescope may be tilted to calibrate the instrument.

Another feature of this invention is the resistance to shock and vibration which is essential in a construction product. As mentioned above only about one percent of the housing tilt is converted to platform tilt through the weak flexure joint of the pendulum. Therefore, distortions of the structure during shock and vibrations during use will likewise have a minimal effect on accuracy. Nevertheless the pendulum is protected against shocks by providing mechanical stops in all directions. To effectively arrest the motion of the pendulum in translation mechanical stops are provided at the center of percussion which in this case is close to the center of gravity. To avoid wire damage due to shocks which might break the wire in tension, and to limit the motion of the pendulum a special caging support is provided on the pendulum. The caging support is near the center of rotation simplifying its design. In one embodiment, the wire is protected from breakage by a leaf spring at its top. Accelerations along the wire deflect the leaf spring so that the load is transferred to the stops provided for the caging-support before the forces can break the wire.

Alternately one or two extension springs can be used to support the weak bending function and shock mounting functions. In cases in which extreme accuracy is not required, this method of platform leveling may be adequate for use with a collimated alignment laser beam, without requiring the second stage correction of a negative lens or weak telescope. A coil spring suspension system such as this is very inexpensive compared with alternative systems such as ball bearing pivot systems.

In a further simplification, the extension spring upper-support is formed from two side by side loops of wire in a hanging link or chain link type connection. Such a simple suspension device will hang vertically within the limits of the wire friction at the joint, i.e. the friction of the spring's loop end moving on the wire loops. The two closely spaced loops of wire will provide the needed support and rotational stability. The leveling accuracy of such a platform is determined by the value of epsilon over theta for the spring and the error due to friction at the upper suspension. This system can be considered a different form of two-stage leveling wherein the rough leveling is accomplished by the small chain link or hanging link and fine leveling is accomplished by the extension spring, both stages being gravity-driven.

This same beam leveling technology is useful in generating a plane of light by mounting a mirrored 45 degree cone on the pendulous platform. In this case, the correcting optic must then be circular about the axis of the cone. The surfaces of the optic become surfaces of a torus.

In the case where the wire loops or links support the upper end of the spring in a hanging link type connection, plane windows may be used in the housing since nearly 100% tilt correction will be achieved by the pendulum.

An added feature of the present invention is the ability to project two beams in the horizontal plane which are at precisely 90 degrees to each other. By placing the housing on its side the pendulum is inactive and held against internal stops by gravity. The two light beams exit the housing and may be positioned by rotating the housing. Such a feature is useful in construction for laying out orthogonal lines on a floor.

To avoid the use of the instrument outside its self-leveling range, two types of safeguards may be provided. In the first, the contact between the pendulum and rubber bumpers may be detected electrically. In the second, the base width and the location of the center of gravity are designed so that the case tips over on surfaces which exceed the self-leveling range of the instrument.

The utility of the invention is enhanced and supported by mounting accessories. A threaded hole in the housing of the unit is used in conjunction with clamps and brackets to mount the unit for special job site conditions and purposes. For example a reference point on the ground may be effectively and accurately transferred using a translucent base which allows the upwardly directed plumb beam to be located on both sides of the mounting base. This is a direct replacement of the conventional plumb bob. The laser instrument is much easier to use because of the complexity of adjusting the string length and waiting for the plumb bob motion to subside. A mounting base which supports the instrument in both of its orientations may position the instrument in relation to a reference location on the mounting base. The outer boundaries of the instrument mate to the mounting base to ensure alignment of a reference position on the mounting base with the beam origin on the instrument. A precise rotating turntable may be included in the mounting base to facilitate angle turning. Those skilled in the art will be able to propose other arrangements between the instrument and numerous mounting conditions which accomplish the same objective of transferring a reference location on the instrument to mounting accessory using the above mentioned translucent point transfer means.

In construction it is often necessary to provide a controlled slope for the flow of water runoff or to align one sloping surface with adjoining surfaces. The utility of the present instrument is enhanced by an accessory which deviates the level beam a controlled amount above or below level. For convenience the accessory may clip onto the instrument which automatically aligns the apertures and provides for easy handling and previous mounting arrangements. The continuous and accurate deviation of the level beam is accomplished by sliding two lenses of equal and opposite power past each other. When the lenses are aligned there is no deviation of the beam. As one lens is moved relative to the other, the beam is deviated linearly. A scale may be integrated with the lens to allow the angle to be read directly from the location of the lens relative to the holder. The deviation angle is equal to the lens movement divided by the focal length of the lens. For example a 500 mm focal length positive lens in front of a 500 mm negative produces a five percent deviation when it is slid 25 mm. Because of the relatively long focal length of the lenses and the small diameter of the beam, the aberrations due to varying angle of incidence caused by the five degree self-leveling range are negligible.

The instrument's utility is further enhanced by using a pentaprism or two-mirror equivalent to redirect the level beam 90 degrees. Such a procedure is commonly used in the construction industry. To achieve high accuracy the included angle between the two reflecting surfaces must be exactly 45 degrees. In addition the vertical axis of the pentaprism equivalent must be aligned in the plumb direction. The vertical axis of the pentaprism or equivalent is defined by the line formed by the intersection of the two reflecting surfaces. The error in the 90 degree deviation is twice the error in the 45 degree included angle between the two mirrors plus the error due to the misalignment of the vertical axis of the pentaprism or equivalent. A beam entering the pentaprism equivalent which is 14 minutes off plumb will have a deviation error of 4 seconds of arc. In addition the exit beam will no longer be level. Such misalignment is normally avoided by using a bubble level and adjusting screws on the pentaprism equivalent to align the vertical axis in the plumb direction.

This manual alignment step may be eliminated by using a gravity activated self-leveling and motion damping means. The initial orientation of the vertical axis of the suspended pentaprism equivalent may be adjusted by changing the location of the center of gravity or by changing the point of attachment of the suspension. This adjustment requires an alignment means to determine the location of the vertical axis on the pentaprism equivalent either by location of the reflective surfaces or their effect on a transmitted beam. As the unit is tilted off plumb the pendulous suspension reduces the amount of tilt proportionally. Since the accuracy required for pentaprism alignment is much less than for the laser platform alignment described above, a value $\epsilon/\Theta$ on the order of ten percent is adequate. Metal spring means with magnetic damping means may be used for these purposes. A viscous rubber suspension means allows both the functions of proportional deflection and damping to be accomplished in the same member. The viscous rubber suspension means may be used in either tension or compression to achieve the functions of damping and proportional deflection.

DESCRIPTION OF THE DRAWINGS

FIG. 1 is a partial section view of pendulous laser projector hanging by a single support above a rotating pentaprism.

FIG. 2A is a partial section view of a laser projector on a floated platform for projecting a self-leveled laser beam.

FIG. 2B is a partial cut-away drawing of a self-leveling platform using a ball bearing pivot.

FIG. 3 is a partial section view of a laser projector and a liquid film compensation means for projecting a level laser beam.

FIG. 4 is a partial section view showing a laser projector with a wire compensation means for producing a plumb beam directly and a level beam with the aid of a pentaprism.

FIG. 5 shows a laser beam and a wire hung mirrored cone compensation means for producing a level plane of light.

FIGS. 15B and 15C show a variation of a link type pendulum spring suspension, as an alternative to that shown in FIGS. 15 and 15A. FIGS. 15D and 15E show a further variation.

DESCRIPTION OF PREFERRED EMBODIMENTS

Figure 7A:
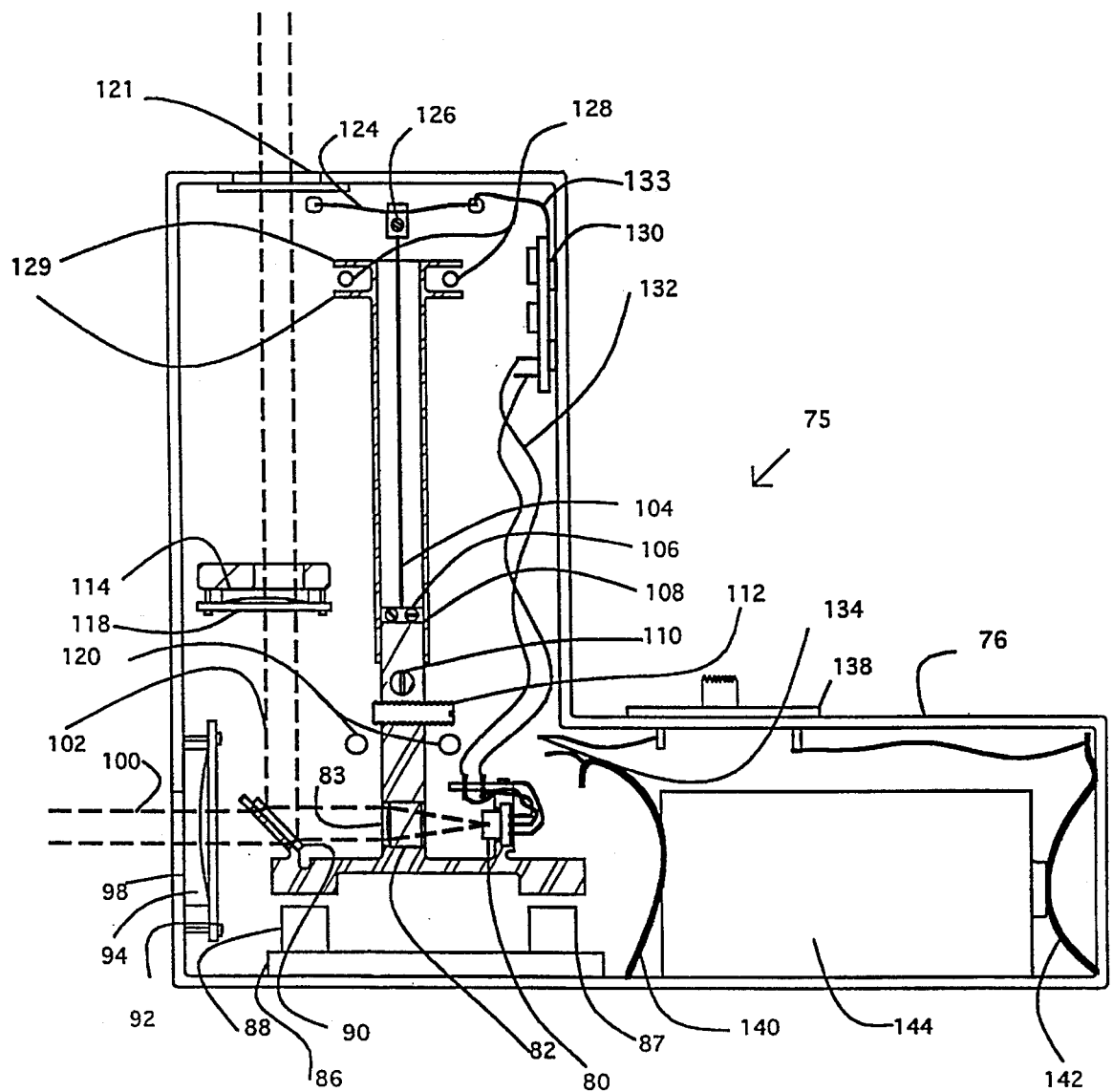
FIG. 7A is partial section view of a preferred embodiment of the invention in which the self leveling is accomplished using a very flexible wire.

FIG. 7A shows a preferred embodiment of a level and plumb tool having a case or housing 75, 76. In FIG. 7A visible laser diode 80 is mounted in an aluminum pendulum 82. The diverging beam from the laser is partially conveyed by a lens 83, although the beam continues to diverge slightly. The emerging light beam 100 is partially reflected by a beam splitter 90 creating an upwardly directed beam 102. Exit windows 98 and 121 are provided for the level and plumb beams.

The pendulum hangs by a single wire 104 whose stiffness is very low, allowing the pendulum to hang very nearly plumb when the tool 75 is tilted. Since the pendulum weighs approximately 10 grams, a 0.1 mm diameter wire, 50 mm long is sufficiently weak to allow the pendulum to hang within one percent of the housing tilt, i.e. to have an error from plumb which is within one percent of the housing tilt angle. The wire is fastened at the top and bottom with wire clamps 126, 106. An essential feature of this design is the ability to easily and accurately adjust the level and plumb beams to the precise level and plumb. Adjustment screws 110 and 112 are used for this purpose in the illustrated embodiment. Turning the screws finely adjusts the location of the center of gravity, thus redirecting the laser beams. There are other well known methods of shifting the location of the center of gravity, such as selectively adding or subtracting weight.

Final compensation of the laser direction is provided by negative (concave) lenses 94 and 114 for the horizontal and vertical beams 100 and 102. These lenses receive the slightly converging primary laser beams, which are slightly out of plumb/level when the housing is tilted, and compensate their direction back to fully plumb/level (within accuracy of about 20 seconds), while also focussing each beam to fully parallel.

Further, these lenses 94 and 114 provide for fine adjustment of the tool. By translating the lenses (e.g. up/down in the case of the lens 94), the outgoing beams can be finely steered. Since the exit beam is collimated for the range of the instrument, the focusing of the lens 83 must be done with the negative lenses 94 and 114 in place. The lenses are held in place by clamps 92 and 118 which permit translation, i.e. sliding movement generally perpendicular to the laser beam.

High accuracy is obtained by using the correcting effect of the negative lenses, as the case is tilted, to correct for the slight lack of plumb and level caused by the stiffness of the wire. For example, if the case 76 is tipped one degree, the beam moves on the lens an amount equal to sine of one degree times the distance to the negative lens (although this distance varies with tilt, the elements of the instrument are arranged so that this variation is negligible in the correction). This amount of motion, divided by the focal length of the lens, is equal to the compensation of the beam provided by the lens. For a wire stiffness sufficient to allow the pendulum to deflect one percent of one degree, the deviation of the beam going through the negative lens is one hundredth of one degree (0.01°). Although one percent has been chosen in this example, smaller or larger percentages would also provide the required compensation.

To allow eddy currents to damp the oscillation of the pendulum, magnets 87 and 88 are positioned close to the pendulum. A pole piece 86 enhances the magnetic field. Mechanical stops are provided to limit the motion of the pendulum and to protect the wire and clamps from damage due to mechanical shocks, while allowing the preferred 5° of tilt compensation in each direction. Stops 120 are positioned close to the center of gravity of the pendulum to minimize shock induced rotation. Stops 128 restrain up/down motion of the pendulum. A tubular pendulum restraint 108 prevents damage to the wire from unwanted upward motion of the pendulum by cooperating with the upper pendulum mounting. The upper wire clamp 126 is attached to a leaf spring 124 to allow downward motion of the pendulum. If the unit is dropped, the force on the pendulum deflects the leaf spring allowing a pair of flanges 129 at the top of the pendulum restraint 108 to make contact with the stops 128 before the tension in the wire is high enough to cause any damage to the wire.

A battery 144 is held in place in the case 76 by a spring 140 at the rear and a spring 142 at the front. A switch 138 controls the flow of current to a lead 134 whose connection to a circuit board 130 has been omitted to reduce the complexity of the drawing. The circuit board 130 is mounted to the housing 76 and drives the laser diode 80 using three electrical leads. The supporting wire 104 may be used as one of these leads, connected to the circuit board by a lead 133. Leads 132 are fine copper or gold wires which convey power to the diode. The wire diameter is less than 25 microns to avoid any mechanical forces which might disturb the pendulum. In addition, the length of the wire is relatively long to reduce the effect of any mechanical forces which do exist. The mechanical forces may be further minimized by attaching the electrical leads closer to the pivot point and subsequently connecting them to the laser diode. Such wires have a resistance which is sufficiently low that there is negligible power loss in the wire. Although the circuit has been mounted on the housing with diode control wires connected to the pendulum it is acceptable, as an alternative, to mount the drive circuit on the pendulum and convey the power leads in the manner described above.

Figure 7B:
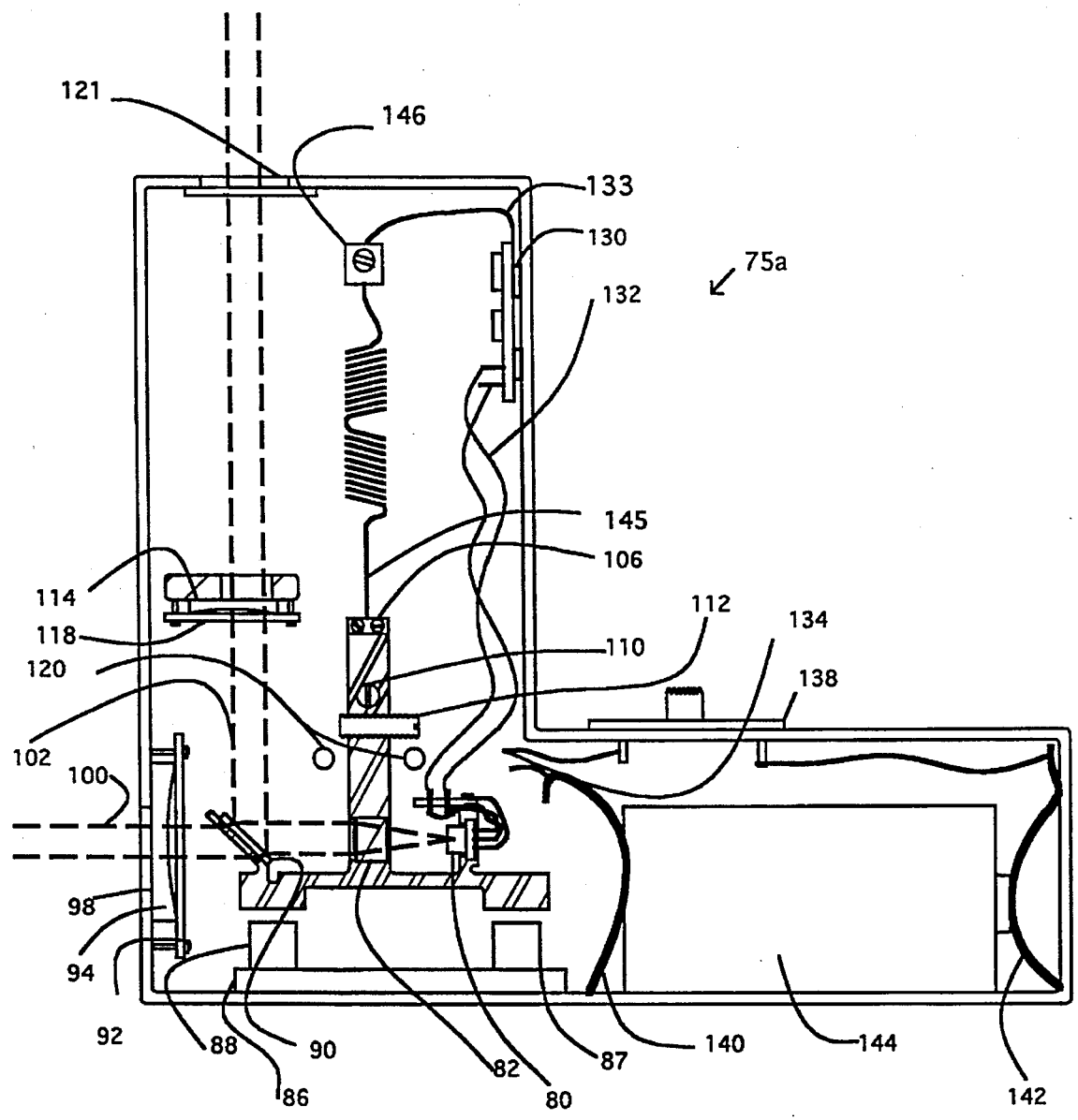
FIG. 7B is a view similar to FIG. 7A but showing a modified embodiment in which the self leveling is accomplished using an extension spring.

In the preferred embodiment of FIG. 7B an extension spring 145 provides the platform self leveling as well as the required shock mounting. It is fastened to the housing using a clamp 146. The extension spring is designed to deflect approximately 99 percent of the housing tilt angle, as is the wire described above. The compliance of the spring along the axis of the spring allows the instrument to be dropped along this axis without serious damage. The critical spring fastening, therefore, does not experience high shock forces. To minimize twist in the pendulum due to inadvertent off-axis location of the center of gravity, the extension spring is wound with right hand and left hand sections. This also minimizes or eliminates rotation of the pendulum under changing temperature conditions.

Figures 8A, 8B:
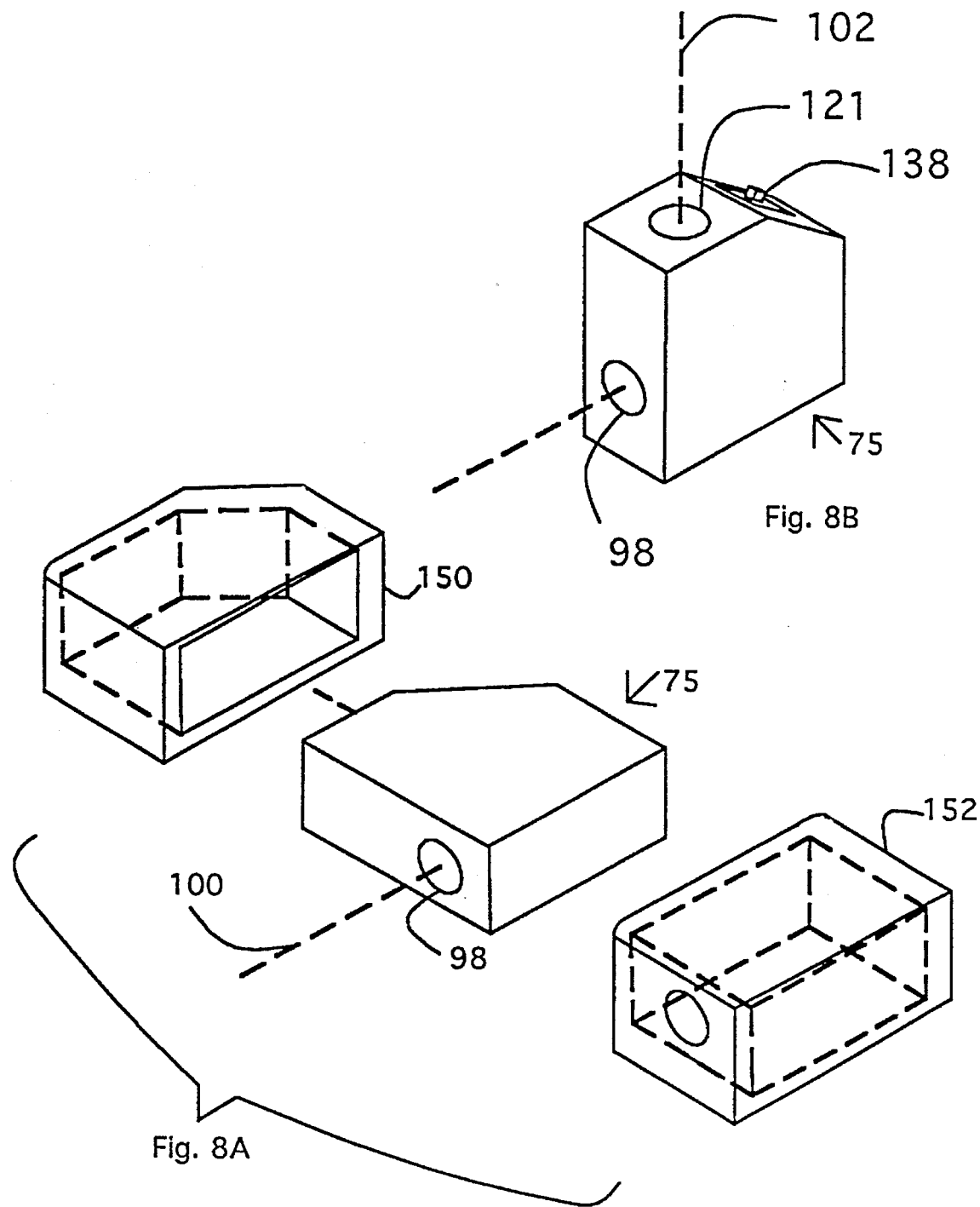
FIGS. 8A and 8B are perspective views showing the instrument of the preferred embodiment projecting two orthogonal beams, with FIG. 8A showing the beams projected in a horizontal plane and FIG. 8B showing projection of a vertical and a horizontal beam.

FIGS. 8A and 8B show the instrument 75 used in two modes of operation. In FIG. 8A the unit is projecting two laser beams at precisely 90 degrees to each other. The unit includes restraint or caging (not shown in this figure) for the pendulous mount, for the mode of operation wherein it is laid on its side, in which no leveling function is needed. The unit in FIG. 8B is projecting a plumb and level beam of light. The numbered parts correspond to the same numbers of FIGS. 7A and 7B.

FIG. 8A also indicates schematically a feature of the instrument which preferably is included to protect the instrument and its accurate operation from damage due to impact. A rubber or rubber-like elastomeric casing is shown as two separable portions 150 and 152 in FIG. 8A. The two portions assemble over the instrument to provide a relatively thick, cushioning and shock absorbing cover which prevents damage from dropping or other impact. The protective cover can be formed in other configurations than that illustrated, and can be held to the instrument's housing by adhesive or mechanical fasteners.

The invention provides a self-leveling platform which can be used in several ways to generate optical reference lines and planes. These lines and planes of light can be finely adjusted using optics as described above and are not limited to the simple plumb line or level line.

Figure 9:
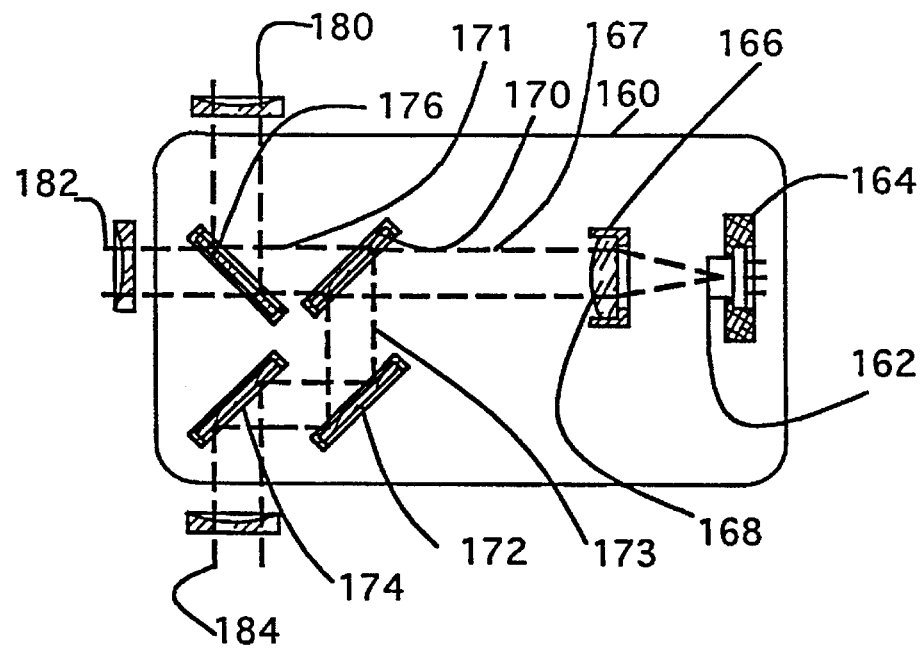
FIG. 9 is a simplified drawing of an embodiment of the invention which produces multiple alignment beams in three orthogonal directions.

In an alternate preferred embodiment shown schematically in FIG. 9, two plumb light beams and a single level beam may be projected simultaneously as may be needed for special alignment requirements. The two plumb beams may be collinear (or two level beams could be collinear). The invention functions as in the embodiment described above, with suspension (not shown) as above, except for a modified mirror arrangement. One preferred modified arrangement is shown in FIG. 9. A laser diode 162 is mounted in a mount 164 and projects a light beam 167. A lens 168 is mounted in a focusing stand 166 for focusing as described above. A beam splitter 170 transmits about 66 percent of the light while reflecting 33 percent of the light. The transmitted beam 171 is subsequently divided by a beam splitter 176 to create a plumb up beam 180 and a level beam 182. A reflected light beam 173 is further reflected by mirrors 172 and 174 to create the plumb down beam 184. In this way three orthogonal beams are formed or two collinear beams and an orthogonal third beam. A platform 160 supports this optical assembly which is mounted to a magnetically damped pendulum as described above. In a like manner, an optical assembly can be constructed to produce three level beams which are all in the horizontal plane. It is clear to those skilled in the art that this method can be extended to producing five light beams which are level or plumb and collinear.

Figure 10:
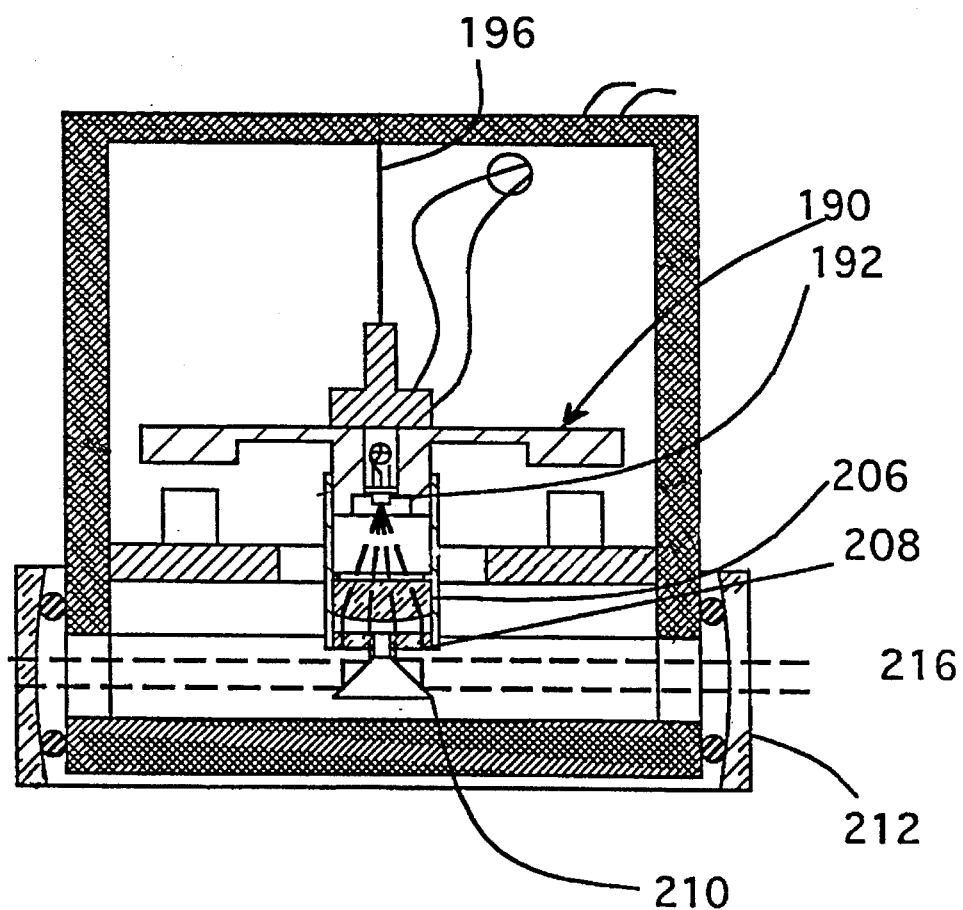
FIG. 10 is a simplified drawing of an embodiment which produces a plane of light.

In a further embodiment of the self-leveling platform combined with optical compensation, a plane of light can be generated using a mirrored cone as shown in FIG. 10. A laser diode 192 is mounted in a pendulum 190 which is supported by a wire 196. The diverging beam from the laser diode is partially collimated by a lens 206 and is transmitted through a window 208. Subsequently it is reflected by a mirrored cone 210 (which swings with the pendulum), emerging slightly converging, and redirected and focused by the negative optical power of a surrounding plastic cylinder lens 212. A plane of light 216 emerges through the plastic cylinder directed away from the instrument in all directions. The plane of light can be finely leveled by tipping the cylinder in a analogous manner to the methods described above. In the weak reverse telescope implementation of two-stage leveling, the weak negative toroidal lens is replaced by a toroidal reverse telescope. In this case the light plane approaching the weak telescope is substantially fully collimated, having the advantages described above and also below with reference to FIG. 19.

Figure 11:
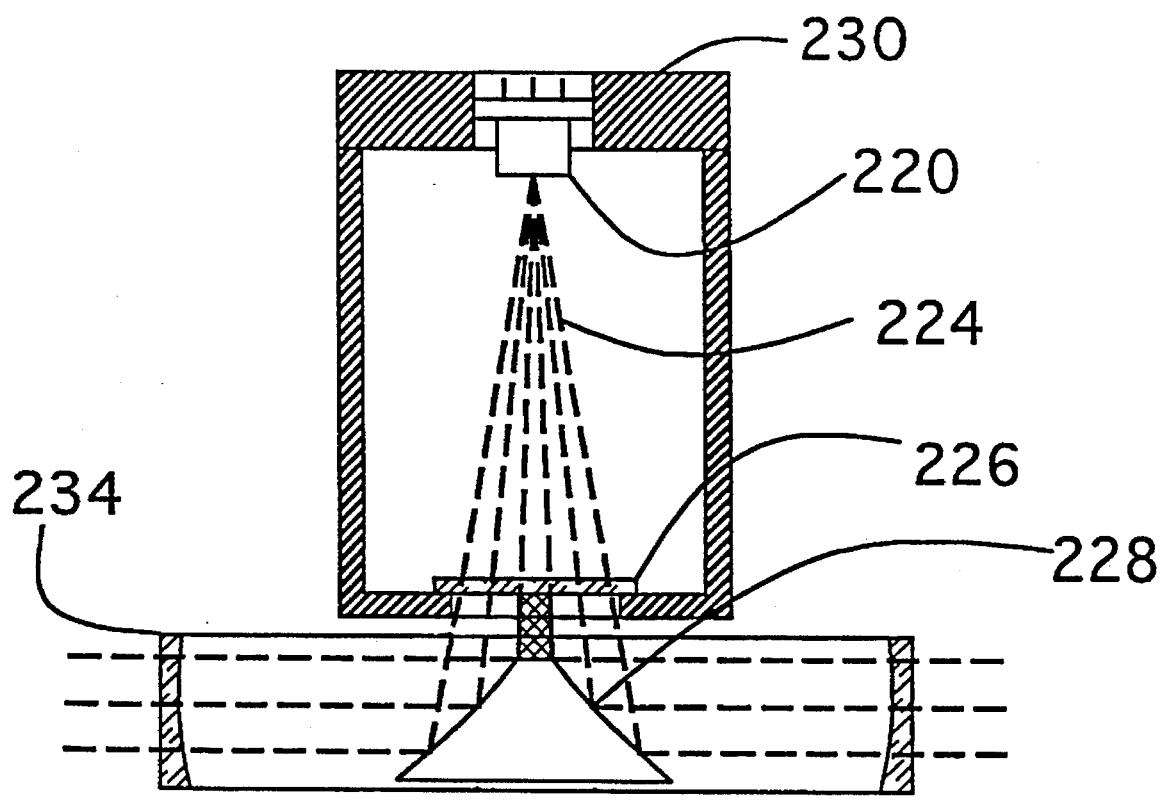
FIG. 11 is a partial section drawing showing the generation of a plane of light with one reflective element, according to another embodiment of the invention.

FIG. 11 shows an alternate embodiment of an optical subsystem which enables generating a plane of light with one optical element. An axicon reflector 228 replaces the lens and conical reflector of FIG. 10 with a single reflector element which can be molded plastic. The reduction in pendulum weight through the use of the single plastic molded reflector allows a reduction in the size of the magnet needed for damping (now shown in FIG. 11). In the optical subsystem of FIG. 11 a laser diode 220 fixed to a pendulous platform 230 (pendulum support not shown) produces a diverging beam 224 which passes through a window 226. The beam is reflected off the concavely-surfaced axicon reflector 228, which preferably produces a reflected beam plane slightly converging. A negative cylindrical lens 234, fixed to the housing and annularly shaped so as to have at least one face comprising part of a toroid, focuses the plane to parallel and also provides the slight secondary tilt correction as in the embodiments above. Thus, the lens 206 and reflecting cone 210 of the FIG. 10 embodiment are replaced by the axicon reflector 228 in FIG. 11. It should be noted that the cone 210 of FIG. 10 is a special case of a family of axicon reflectors.

Figure 12A:
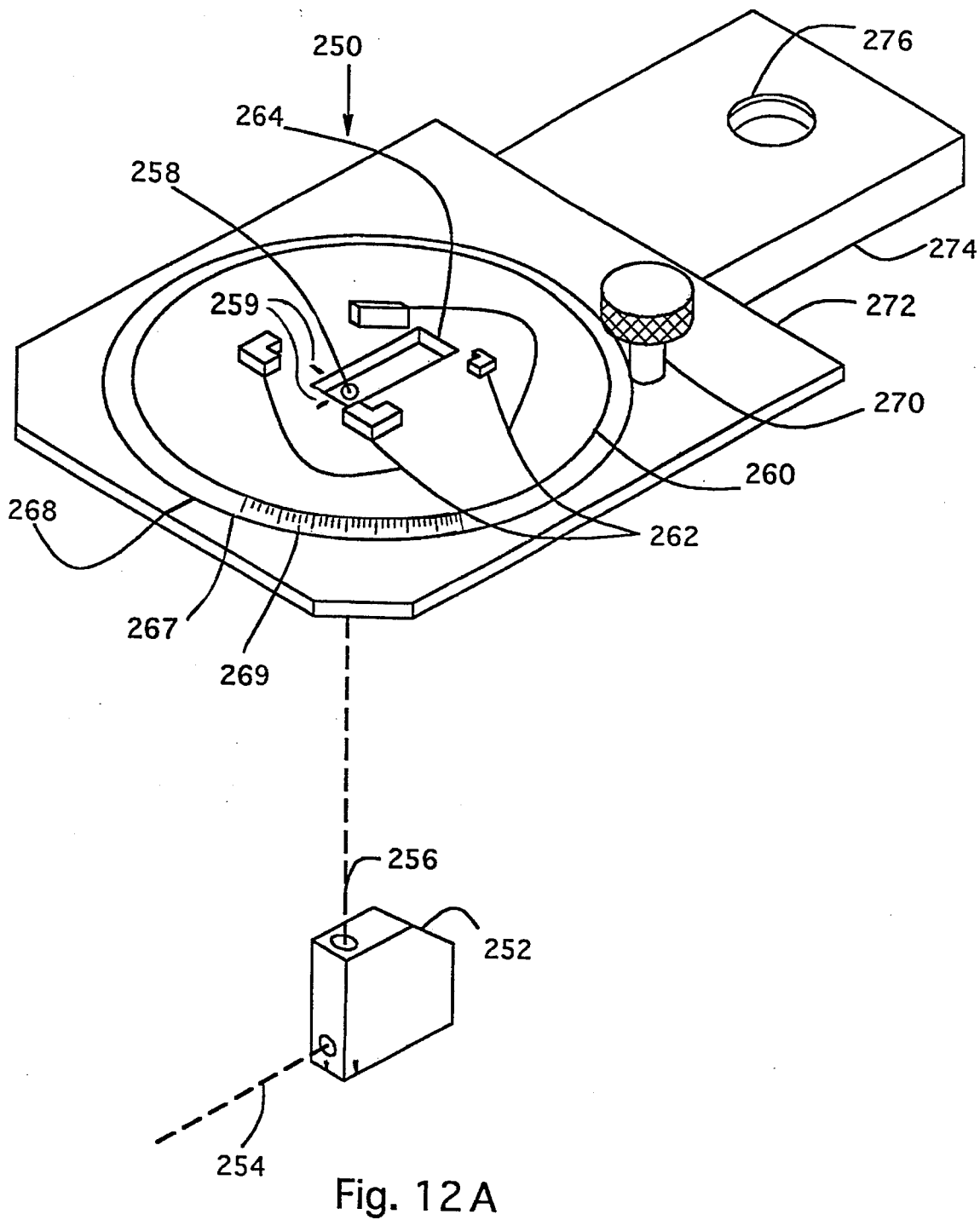
FIG. 12A is a perspective view of the instrument used to transfer a point on the ground to a reference point on a translucent mounting base. The illustrated mounting base has provisions for mounting to a tripod and for positioning instrument beam or beams over the center of rotation of a turntable.
Figure 12:
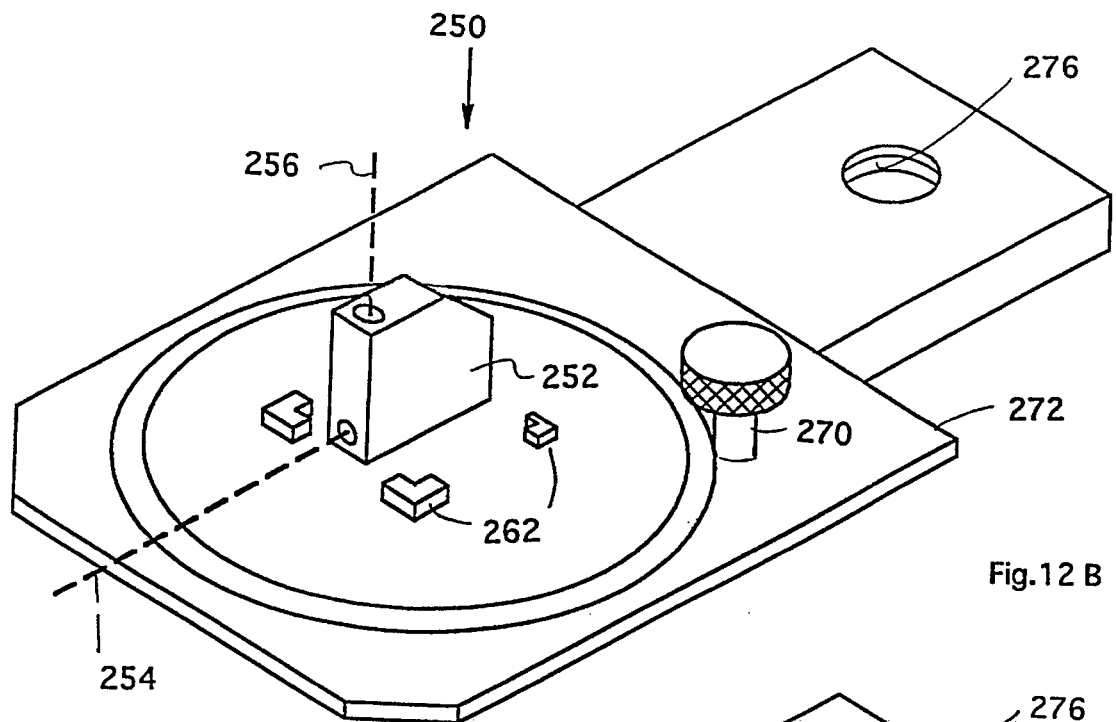
FIG. 12B is a perspective view of the instrument mounted in the recess in the translucent mounting base of FIG. 12A.
FIG. 12C is a perspective view of the instrument mounted in the translucent mounting base in an orientation to project two beams of light at 90 degrees to each other with the intersection of the two beams being located over the center of rotation of the turntable.
Figure 12:
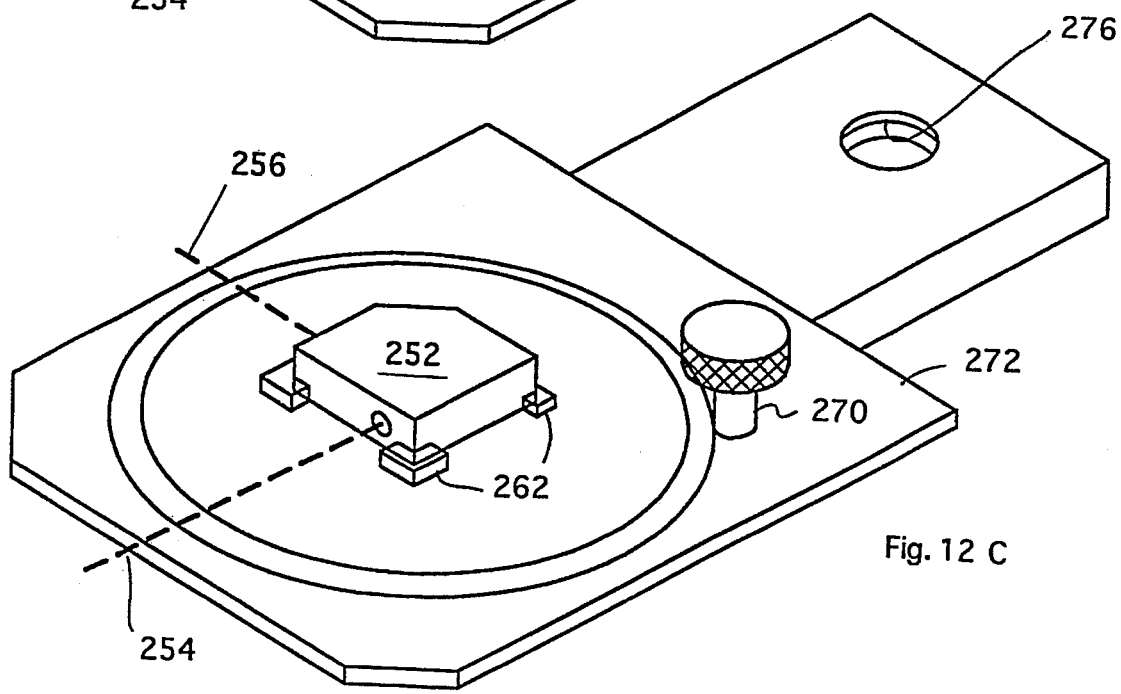

In FIG. 12A an instrument 252 is projecting a horizontal beam 254 and a vertical beam 256 to the mounting bracket generally identified as 250. This set up is to allow the construction worker to transfer a point on the ground to the center of rotation of an instrument turntable. The vertical beam makes a spot 258 on a translucent (frosted or clouded) rotatable support 260. Reference marks are located on the support 250, at 259, for locating the spot 258. Raised portions 262 of this support register the location of the instrument as is shown in FIG. 12C. A lowered portion or recess 264 of this support provides registration for the instrument as shown in FIG. 12B. A divided circle 267 on the support may be read using a reference mark 268, from which indicia 269 (shown in part) are read. This turntable is rotated using a knob 270. It is, therefore, possible to point the turntable to a given angle as required for building alignment. The turntable rests on a plate member 272 which is attached to a base member 274. A tripod thread 276 is provided in the latter member to allow flexibility in locating the base in space. In FIG. 12B the instrument is mounted in such a way that the level beam may be used to generate a plane in space. This is very useful in construction for leveling floors and ceilings. In FIG. 12C the instrument is used to project two horizontal beams at 90 degrees to each other, as in FIG. 8A. In this case the beams may be rotated over a fixed point to lay out the walls of a room.

Figure 13:
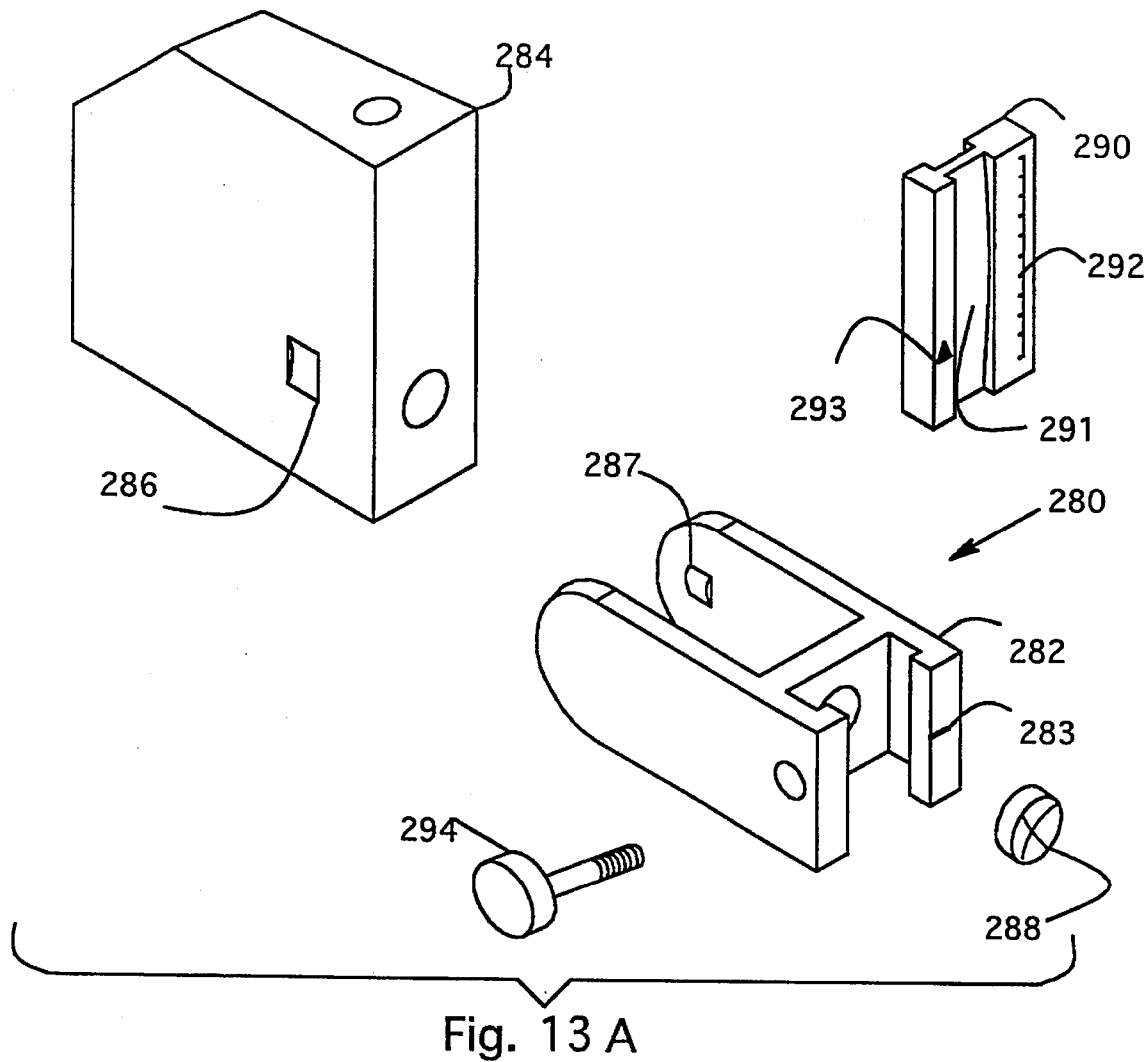
FIG. 13A is an exploded drawing of a beam deviation accessory in front of the instrument. The detail for snapping the accessory to the housing and locking the integrated lens and scale is also shown.
FIG. 13B is a front view of the beam deviation accessory mounted on the instrument of FIG. 13A showing the scale and reference mark.

FIG. 13A shows an exploded view of a beam deviation accessory 280 and the details of its connection to an instrument of the invention 284. A main structure 282 may be snapped onto the housing on the instrument by the operator using indentations 286 and corresponding protrusions 287 on the instrument and the accessory, respectively. A negative lens 288 is mounted in the main structure 282. A reference mark 283 is located on the main structure. A plastic slider 290 has a positive lens curvature 291 molded into it allowing the part to function as a lens. A scale 292 is used in conjunction with the reference mark to display the deviation of the beam passing through the negative lens and plastic slider. The arrow 293 indicates the direction of the beam deviation which can be changed by turning the slider upside down. A locking knob or screw 294 allows for easy adjustment of the beam deviation and secure maintenance of its location.

Figure 13B:
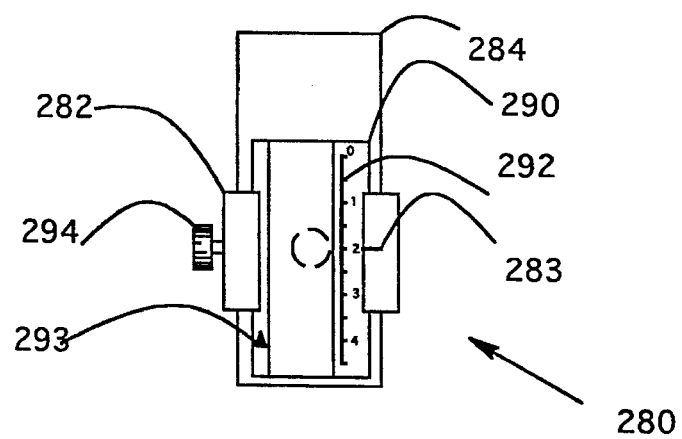

The function of the assembled beam deviation accessory is shown in front view in FIG. 13B. The deviation is changed by loosening the knob 294 and moving the slider 290 until the desired beam deviation is read on the scale using the reference mark.

Figure 14:
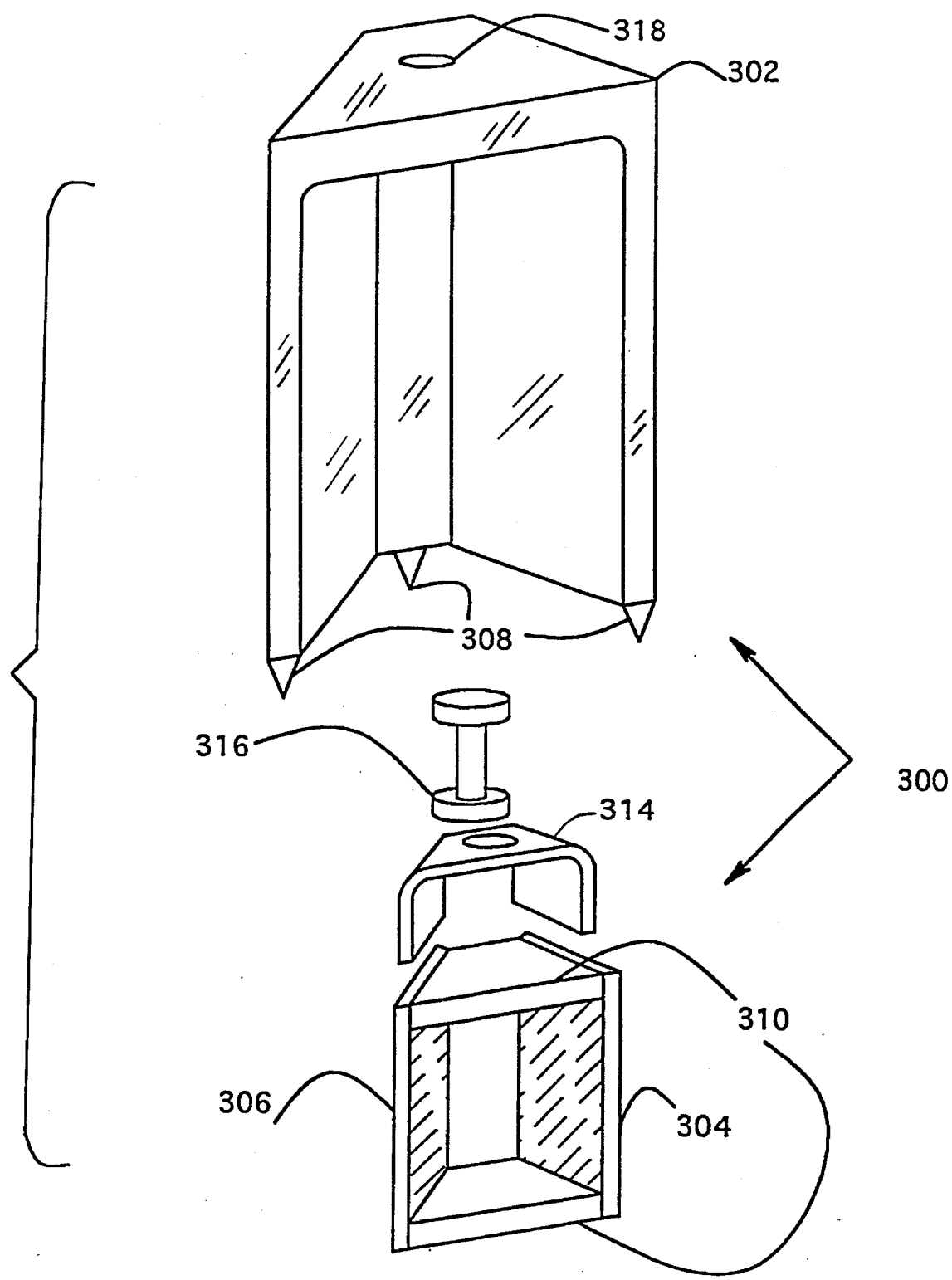
FIG. 14A is perspective view of an accessory using a two-mirror equivalent of a pentaprism with self-leveling capabilities. The level reference beam projected from the instrument is deviated 90 degrees.
FIG. 14B is an exploded view of the accessory for turning the level beam 90 degrees.
FIG. 14C is a section drawing of the upper end of the accessory of FIG. 14B showing a viscous or flexible rubber member in tension used to provide simultaneous proportional tilt and damping.
FIG. 14D is a section drawing of the end of the accessory of FIG. 14B showing a viscous rubber member in compression used to provide simultaneous proportional tilt and damping.

The function of a 90 degree deviation tool 300 is shown in FIG. 14A where the level beam 301 from the instrument 284 is deviated 90 degrees. A housing 302 rests on the floor on three legs 308 (only two are visible in this figure). The beam is reflected by two mirrors 304 and 306 whose included angle is precisely 45 degrees. An exploded view of the tool is shown in FIG. 14B. The angle between the two reflecting mirrors is maintained by a structure 310 which also can be used to support the mirrors. This part has a precise 45 degree angle or the glue layer between the reflecting surfaces and the structure 310 may be adjusted slightly to fix the angle on assembly. A bracket 314 connects the structure to a viscous rubber (or rubber-like) support 316 which supplies a self-leveling pendulum action and the damping required. The rubber support is further connected to the housing 302 using a hole 318. FIG. 14C is a section view of the upper portion of the tool, through the rubber support. The pendulous action can be envisioned from this figure. FIG. 14D is a similar section view showing how a rubber member 320 can be used to provide the pendulous action and damping, in an alternative form of mount. A ridged member 322 connects the support structure 310 to the rubber member and allows the pendulous action.

Figures 15, 15A:
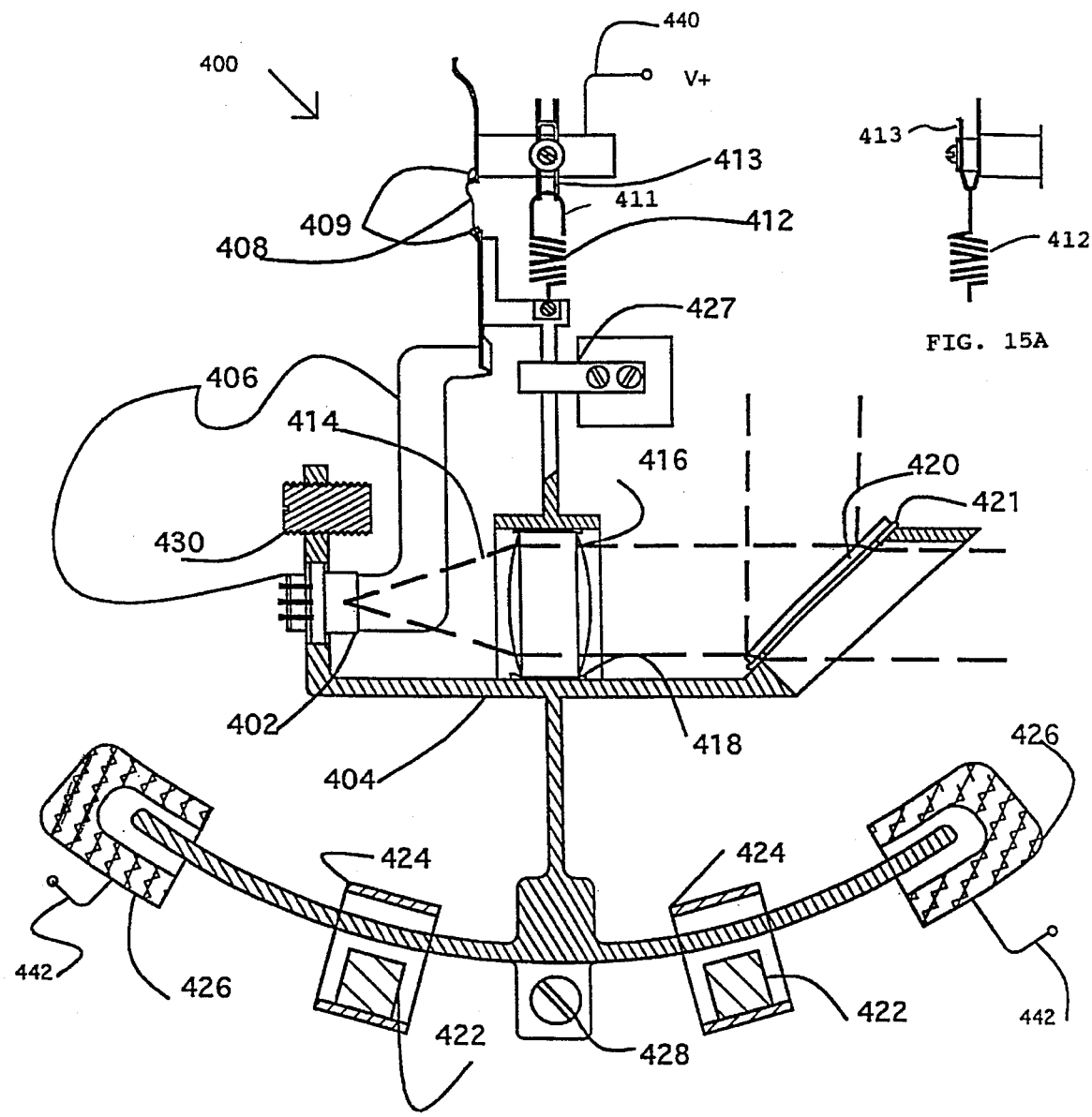
FIG. 15 is a partial section view in elevation of a different form of two-stage pendulous leveling system using an extension spring supported by two loops of wire and generating a plumb and level reference laser beam.
FIG. 15A is a detail view in elevation showing a portion of the apparatus of FIG. 15, seen from the right side.
Figure 15:
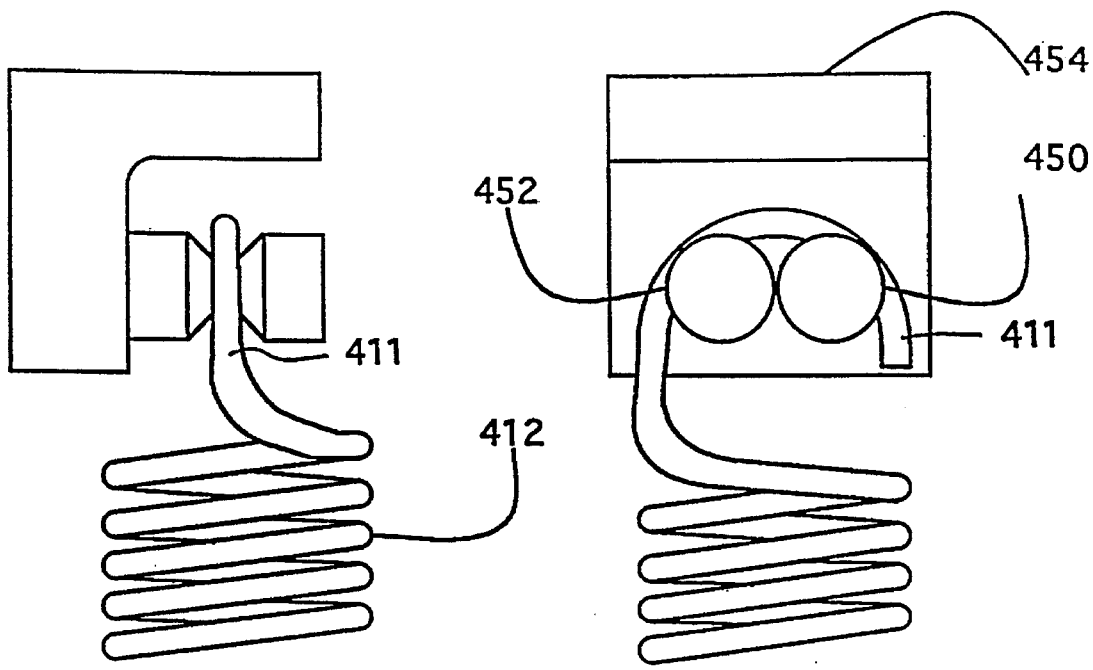
Figure 15:
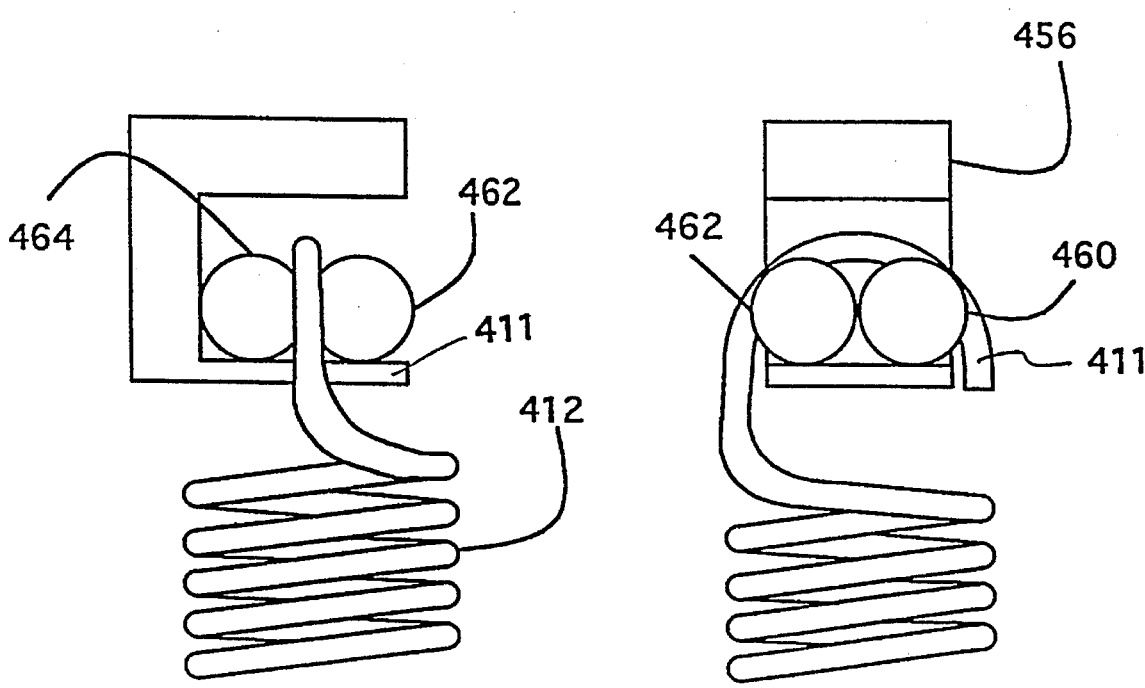

A further preferred embodiment of a self-leveling laser projector instrument for both level and plumb directions is shown generally as 400 in FIG. 15 (casing not shown). A laser diode 402 is contained in a closely fitting hole in a pendulum 404. Electrical contacts to the laser diode 402 are supplied through a flexible circuit 406 which is fastened at the top of the pendulum where three small diameter gold wires 408 make a connection to the flexible circuit with a minimum of mechanical force. These wires are placed near the pivot of the pendulum and have ample slack to minimize the effect of the forces on the accuracy of the self-leveling pendulum. A small amount of rubber-like material 409, e.g. RTV, made by General Electric, for example, is placed over the junction to provide strain relief and spreading out bending to avoid breakage which would be caused by localized bending. Fewer wires could be used, if desired, by utilizing the metal of the pendulum as one conductor. The pendulum swings in all directions—left and right and also into and out of the plane of the drawing as seen in FIG. 15.

Figure 16:
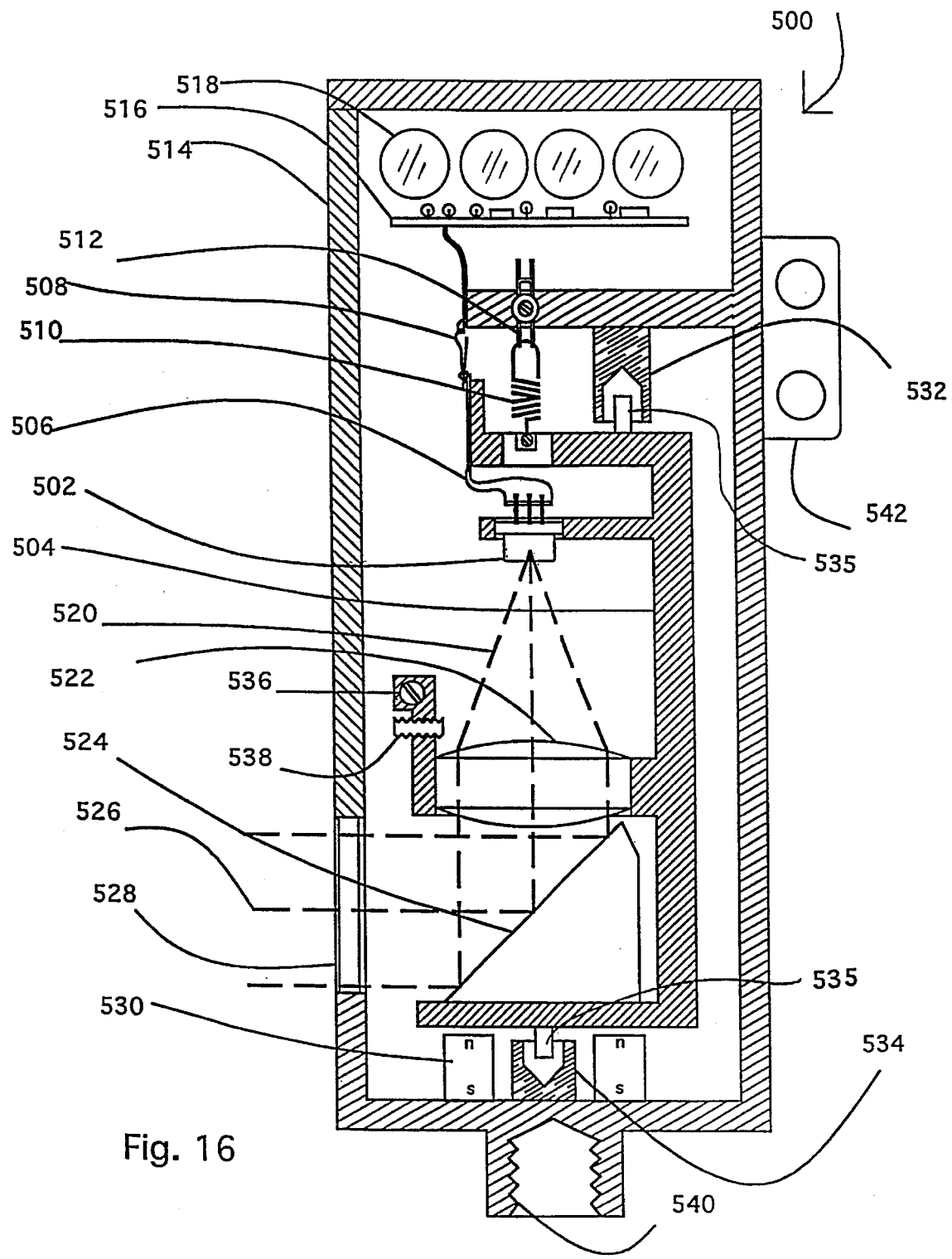
FIG. 16 is a partial elevational section view of a two-stage pendulous leveling system using an extension spring supported by two loops of wire and generating a reference plane of laser light.

A circuit board and batteries for powering the laser diode 402 are not shown in FIG. 15, but may be similar to what is shown in FIG. 16, another embodiment described below.

The pendulum is supported by an extension spring 412 which is attached preferably fixedly to the pendulum on one side and which hangs from a double loop of wire 413, via an upper end loop or hook 411 in a chain link or hanging link connection, on the other side. This mechanical joint is free to articulate, with the double loops giving rotational orientation to the pendulum. As shown, the spring 412 preferably has coils which reverse in direction at about the midpoint of the spring's length, thus reducing net spring twist which occurs with temperature changes. The force of gravity tends to align the pendulum in the vertical direction. Because of the metal to metal frictional contact at the joint between the spring and the loops, the joint will not allow the axis of the spring (the upper end of the string) to be precisely vertical. In practice there is a lack of repeatability of about plus or minus 0.2 degrees. More specifically, the axis of the extension spring will be within 0.2 degrees of plumb when the joint is active and the pendulum is free to hang. The extension spring 412 is designed to provide subsequent alignment in the vertical direction. The spring wire diameter and material stiffness, coil diameter, and the number of turns are chosen to allow the pendulum to further approach the precise vertical orientation. The improvement in self-level provided by the spring can be described by the term epsilon over theta, as discussed above relative to other embodiments. Theta is the tilt of the upper end of the spring from vertical and epsilon is the resulting tilt angle from the vertical of the lower end. In this preferred embodiment epsilon over theta is about 0.02 for a spring steel or music wire of diameter 0.25 mm, coil diameter of 2 mm, 25 turns and a pendulum mass of 8 grams. The overall pendulum tilt error, although it cannot be reliably calculated as the product of 0.2 degrees and 0.02, will be substantially closer to level than either stage acting alone. It should be noted that the approximate self-leveling provided by the articulation of the spring support could also be accomplished using a more expensive double ball bearing system.

In using the tool on rough ground, the user may place the unit on a surface which is tilted beyond the self-leveling range of the pendulum. To avoid making such an error, an out-of-level indicator is needed to alert the user that the tool is no longer accurate. The out-of-level condition can be sensed by allowing current to flow through the pendulum to shock absorbing rubber bumpers 426 (i.e. rubber or rubber-like), described further below. In the normal self-leveling range the pendulum does not make contact with the rubber bumpers. The rubber can be made electrically conductive by the use of an additive in the bumper fabrication. 440 in FIG. 15 shows the application of the voltage while 442 shows the electrical connection to the rubber bumper. Using circuits which are well known the current flowing through the bumper can be amplified and used to control a special indicator or to pulse the pilot light to indicate the out-of-level condition to the user.

FIG. 15A shows the articulating joint between the double loop 413 and the spring 412 in side view.

Light from the laser 414 is collimated by a lens 416 which is fastened to the pendulum 404 by appropriate means such as UV curing cement 418. Subsequently the light is reflected by a beam splitter 420 to produce a plumb beam. The beam splitter 420 may also be fastened to the pendulum 404 by UV curing cement 421. The motion of the pendulum 404 is damped by magnets 422. Pole pieces 424 confine the magnetic field to the pendulum region. The pendulum motion is limited by the shock absorbing bumpers 426 at the bottom of the pendulum. A mechanical stop 427 above limits the pendulum motion in and out of the page.

Fine calibration of the laser beam projector is done by adjusting screws 428 (at bottom of pendulum) and 430 (at left side of pendulum) which shift the center of gravity of the pendulum thus redirecting the laser beams.

The self leveling pendulum arrangement shown in FIG. 15 may be encased in a housing similar to those shown above in FIGS. 7A, 7B, 8A, 8B, 12A–C, 13A and 14A. Such a housing has a size preferably in the range of about 25 to 50 mm in thickness, 50 to 100 mm in both length and height, although the size can be larger if desired for particular applications. In one preferred embodiment the housing is 100 mm by 100 mm by 50 mm thick. The rubbery protective casing described relative to FIG. 8B may optionally be used. The pendulum 400 of FIG. 15, in one preferred embodiment, is about 65 mm from the bottom to the connection with the spring, about 11 mm wide at bottom and with a total weight of about 11 grams. As noted above the pendulum can be of less mass, about 8 grams, and in fact it can have a mass within a fairly broad range, so long as it is heavy enough to overcome friction factors and spring strength as desired to the performance limits outlined above, but yet as light as can practically be achieved so that the overall tool weight is kept relatively low.

As an alternative to the chain link type spring support connection at 411, 415 in FIG. 15, FIGS. 15B and 15C show the hook end 411 of the spring 412 supported by two grooved cylinders 450 and 452, supported by a frame 454. The two figures are side and front views of this alternative link type support assembly. It can be seen from the figures that the spring (and attached pendulum) are free to swing in all directions.

FIGS. 15D and 15E show another suspension arrangement wherein the spring 412 is supported by four spheres. Because the spheres are aligned and arranged in a square, only two of the four spheres are visible in each drawing. The sphere 462 is visible in both drawings while spheres 460 and 464 are each visible in only one view. To fix the four spheres in place on a frame 456 the frame may include recess seats (not shown) in a supporting ledge 458 in which the spheres are closely received and kept in contact. As in the grooved cylinders 450 and 452 described above, the spheres may be of smooth polished metal such as stainless steel.

The above described spring supporting structures provide a two axis swiveling of the pendulum while maintaining directional orientation of the pendulum. The designs differ in their ease of assembly, cost and residual friction. Other designs may exist which are slightly different but have the same function.

In a further embodiment designated generally by 500 in FIG. 16 a laser diode 502 is mounted in a closely fitting hole in a pendulum 504. The power to the laser diode 502 is supplied by a flexible circuit 506 which has three small diameter conducting wires 508. The pendulum is supported by an extension spring 510 which attaches to the pendulum 504 on one side and to a double loop of wire 512 on the other, as described above. The joint between extension spring and the double loop of wire is free to articulate as the housing 514 is tilted. This joint has typically a reproducibility of 0.2 degrees due to friction in the joint, as discussed above. The extension spring is designed with an epsilon over theta of 0.02 so that the pendulum hangs plumb within tens of seconds of arc from true plumb for allowed tilt angle of the housing. As in previous embodiments the connection wire locations and design parameters are chosen to keep the forces exerted by the wire on the pendulum at a minimum so as not to compromise the accuracy of the plumb alignment of the pendulum. A circuit board 516 contains the control circuit needed to control the laser diode.

Batteries 518 are connected to the circuit board with wire, not shown. A laser beam 520 from the laser diode is collimated by a lens 522. The beam subsequently is reflected from a reflecting cone (a partial cone, as shown in the drawing) 524 to form a plane of light 526 which exits the housing through a window 528. The mirrored cone 524 is mounted to the pendulum 504. The motion of the pendulum is limited by an upper bumper 532 and a lower bumper 534 which are constructed of hard rubber fastened to the housing and making contact with appendages 535 of the pendulum as shown. The pendulum therefore hangs from the extension spring within the range of the bumpers, which is typically plus or minus five degrees in preferred embodiments. The calibration screws 536 and 538 change the location of the center of gravity of the pendulum, allowing fine calibration. A threaded recess at bottom of the housing 540 provides tripod mounting capability while a side appendage 542 allows mounting the housing to an auxiliary bracket or other mounting apparatus.

In this embodiment a sector of a plane may be projected through the window 528. By using three such windows wrapped around the pendulum with 45 degree bevels at the corners, a 180° sector of a plane may be generated. This plane may be adjusted to true level by the calibration screw and, therefore, may serve as a level reference for precise construction measurement.

Figure 17:
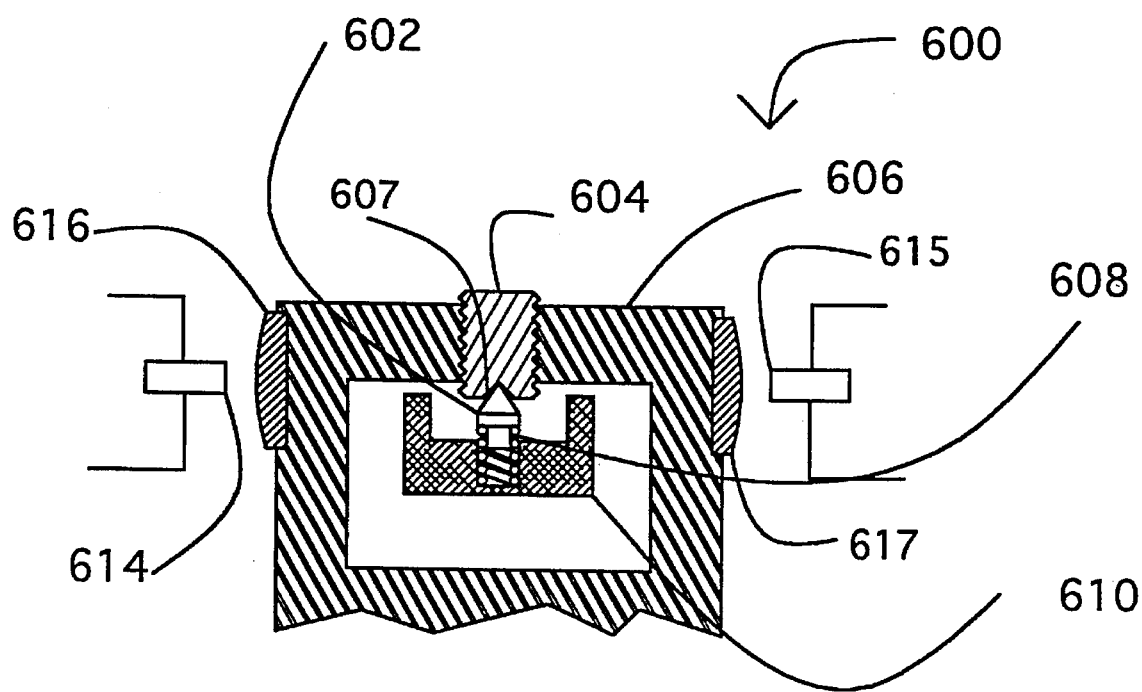
FIG. 17 is a detail view in elevation showing a shock mounted jewel or steel pivot as a pendulum mount in another embodiment, replacing the pendulum mounting arrangements of other views.

In a further preferred embodiment a shock mounted jewel or steel pivot is used to create the pendulum. This is generally designated by 600 in FIG. 17. For simplicity the laser, optics, damping, mechanical stops and fine wire connections are not shown because they preferably are similar to those already described. A hardened steel or jewel pivot 602, essentially cone-shaped as shown, makes contact with a jewel or hardened seat 604 which is adjustable in height in the upper end 606 of a pendulum. The seat has a recess 607 which may be a more divergent cone shape as compared to the pivot and which essentially makes point contact with the pivot 602. A compression spring 608 supports the pivot 602 and is designed to deflect in order that mechanical shocks are not transmitted to the pivot, but are transmitted to a pendulum support 610 which is fixedly mounted to the external housing. Mechanical stops (not shown) contain the pendulum in all directions except within the useful arc of swinging rotation around the pivot. Rotational stops, not shown, are provided to limit the rotation of the pendulum. To provide the needed rotational stability, magnets 614 and 615 on opposite sides of the pendulum attract pole pieces 616 and 617 on the pendulum. The pole pieces are curved generally as shown, to avoid any forces which might tilt the pendulum.

Figure 18:
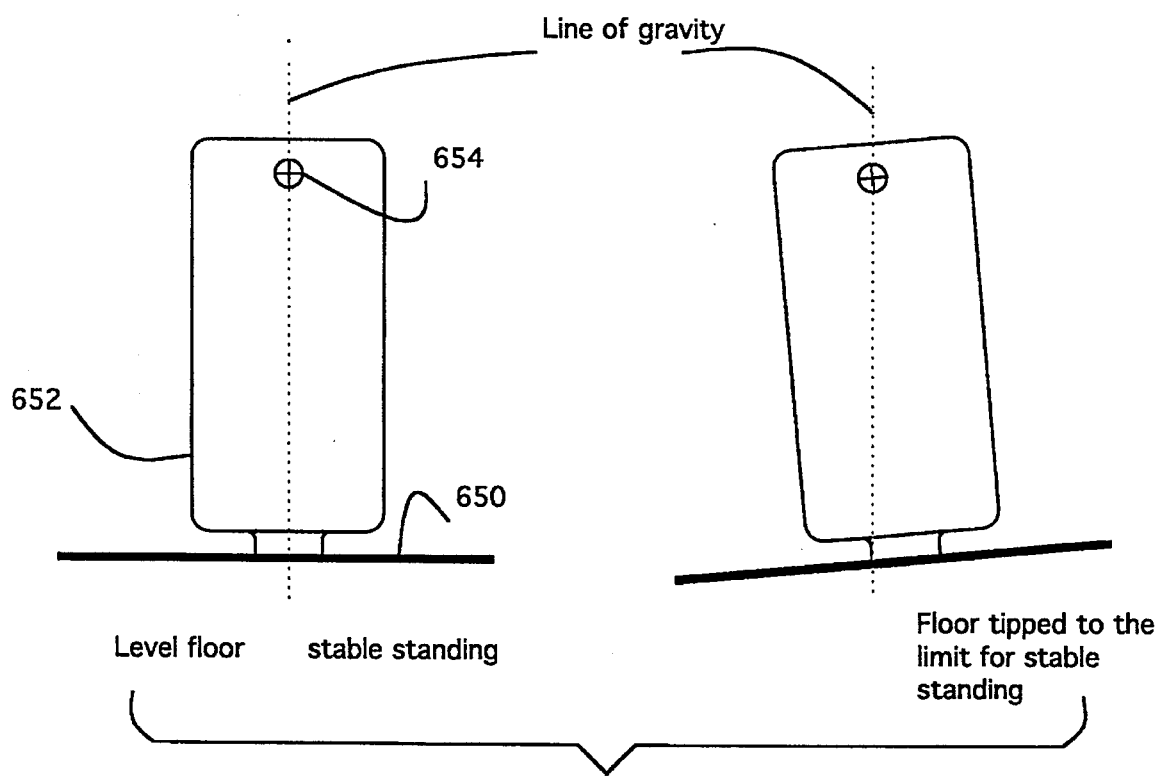
FIG. 18 shows how the width of the base and the location of the center of gravity can be used to cause the instrument to tip over automatically on surfaces beyond the instrument self-leveling range.

FIG. 18 shows two end-views of an instrument of the invention, designated generally by 652. In the view on the left-hand side, the instrument is resting on a level surface 650 in a stable fashion with a gravitational force going through the center of gravity 654 lying within the supporting surface of the instrument. On a tilted surface, the gravitational force causes the instrument to be unstable and to tip over. In the drawing on the right side of FIG. 18, the limiting case is shown between stable standing and unstable standing which topples the instrument, preventing its use outside its self-leveling range.

Figure 19:
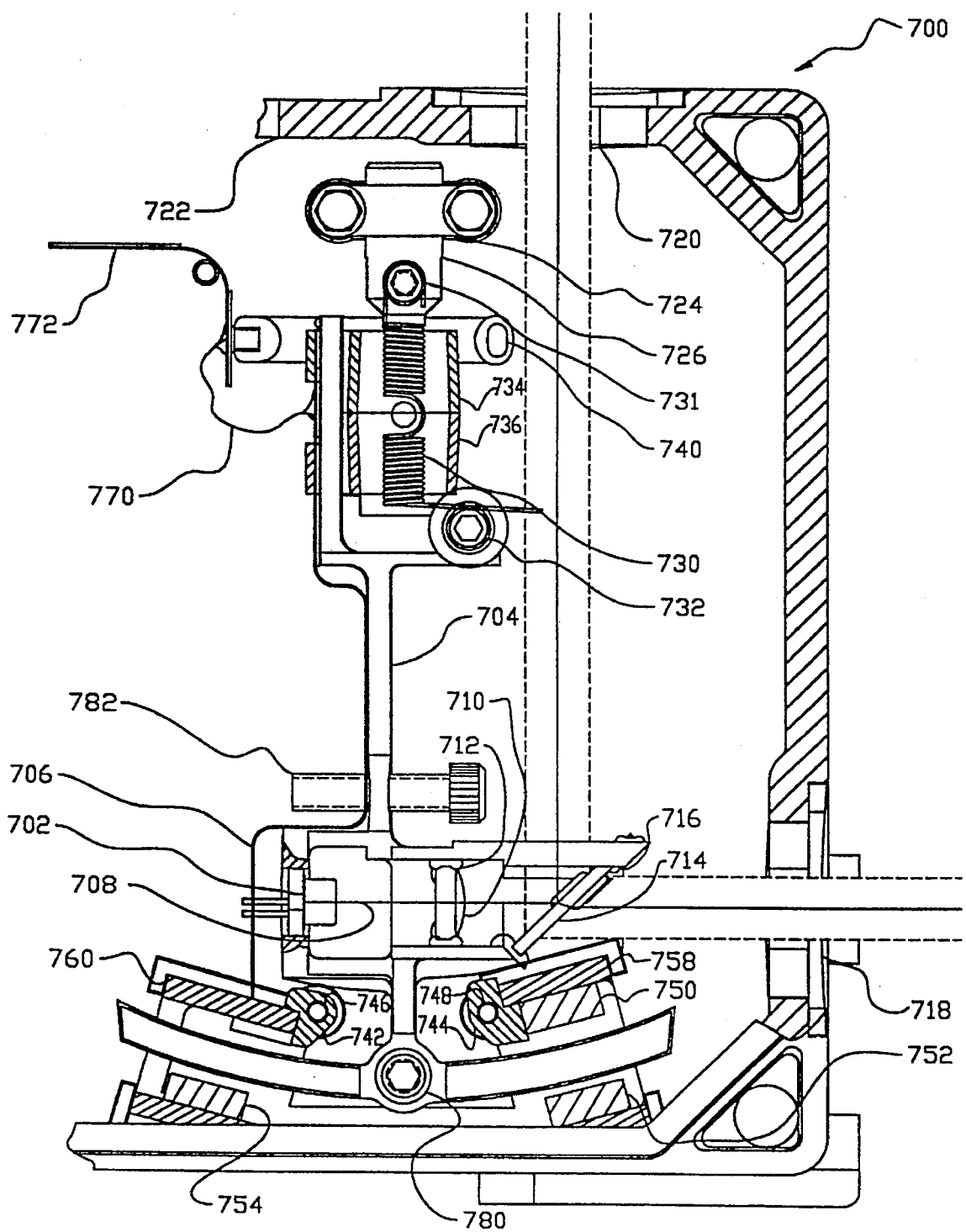
FIG. 19 shows an alternate preferred embodiment of the instrument featuring a pendulum-mounted spring restraint and weak reverse telescopes.

In a further preferred embodiment designated generally by 700 shown in FIG. 19, a laser diode 702 is mounted in a closely-fitting hole in the pendulum 704. The power to the laser diode 702 is supplied by a flexible circuit indicated at 706, which has three conductors. The centerline of the optical beam is shown as 708. A lens 710 is held in the pendulum 704 by adhesive 712 and in this case substantially fully collimates the laser beam. A beam splitter 714 is held in place by adhesive 716. The primary beams proceed through the optics 718 and 720 which are plastic molded telescopes of very low power. As explained above, the use of a collimated beam passing through weak reverse telescopes, as opposed to a slightly converging beam corrected by weak negative lenses, overcomes certain problems of slight defocussing, change in the degree of compensation and conflicting focus between the emerging final plumb and level beams.

The assembly is supported in a case 722 by a bracket 724 attached to the case and further by a sliding cylinder support 726. The bracket 724 has an arcuate shape which wraps around to grip the cylinder 726. This mounting arrangement permits up/down sliding adjustment as well as rotational adjustment of the pendulum 704, upon assembly of the instrument or on subsequent repair. An extension spring 730 is rigidly attached to the cylinder 726 at a flat 731 by a screw, not shown. The pendulum 704 is supported by the spring 730 with a screw 732. A spring restraint 734 and lower spring restraint 736 surround the spring and are attached to the pendulum. A rubber bumper 740 is fastened to the case 722 and surrounds the spring restraints 734 and 736. The pendulum 704 swings freely about the center of the extension spring 730 without the spring restraint touching the rubber bumper 740 as long as the case is within the self-leveling range on the instrument. During mechanical shock or vibration, the spring restraints 734 and 736 prevent the delicate extension spring 730 from receiving a damaging blow from its surroundings. The lower portion of the pendulum 704 is cushioned by rubber bumpers 742 and 744 which are supported by pins 746 and 748, respectively, from the housing. The bumpers limit the motion of the pendulum 704 in and out of the drawing as well as up and down and right to left. Permanent magnets 750, 752 and 754 are fastened to horseshoe-shaped pole pieces 758 and 760. Eddy currents in the pendulum from these magnets damp the motion of the pendulum.

Fine gold wires 770 connect the flex circuit 706 to the case-mounted flex circuit 772 to provide power to the laser diode 702. The wires are approximately 25 microns in diameter. Their location near the pivot point and their size limit their influence over the motion of the pendulum. The fine calibration of the instrument 700 is accomplished by adjusting screws 780 and 782 which shift the center of gravity and allow the collimated laser beams to be positioned in the true level and true plumb directions.

Figure 1:
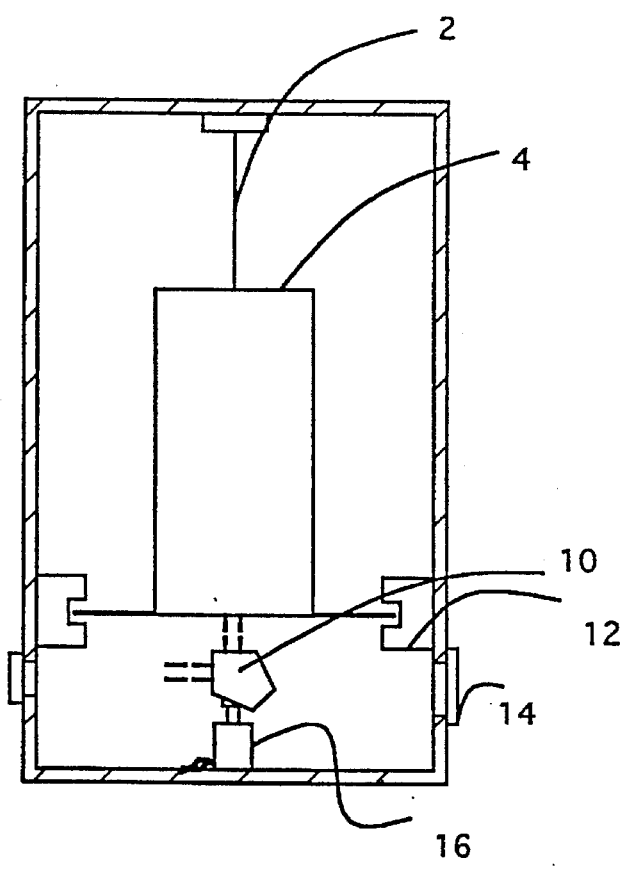
FIGS. 1 through 5 illustrate principles of prior art beam leveling and plumbing devices.
Figure 3:
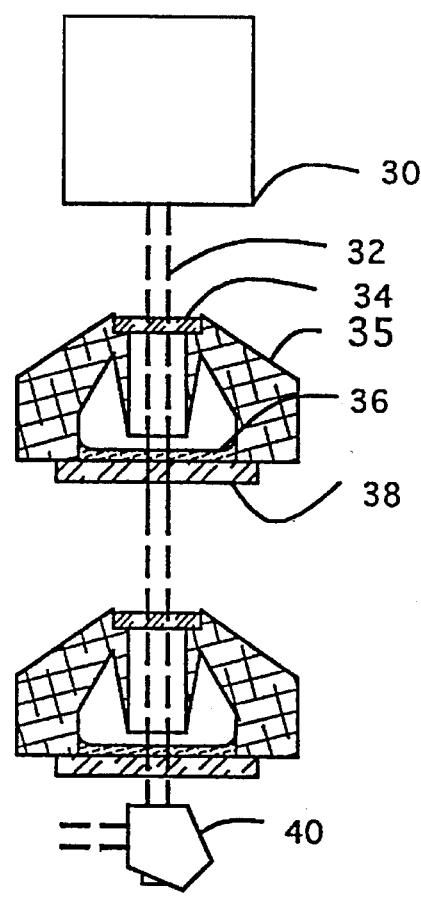
Figure 2:
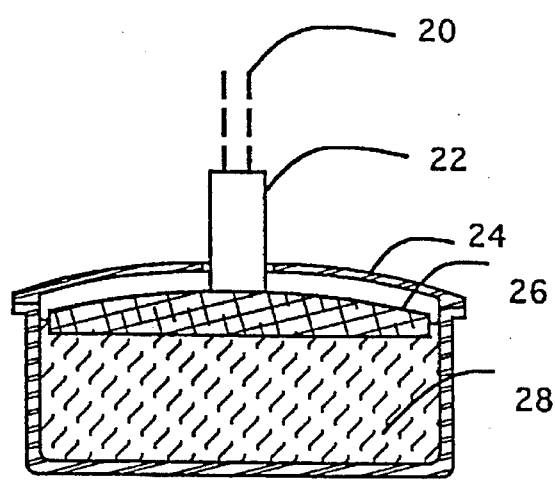
Figure 4:
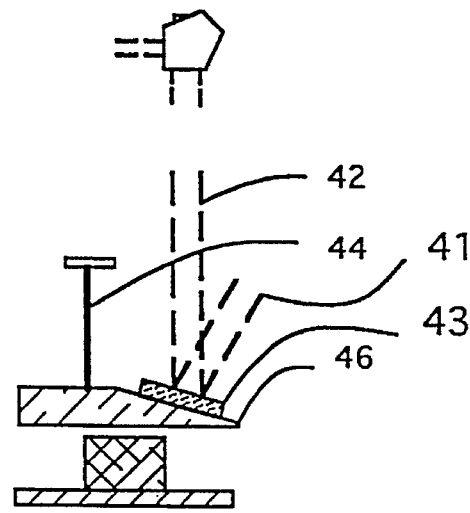
Figure 2:
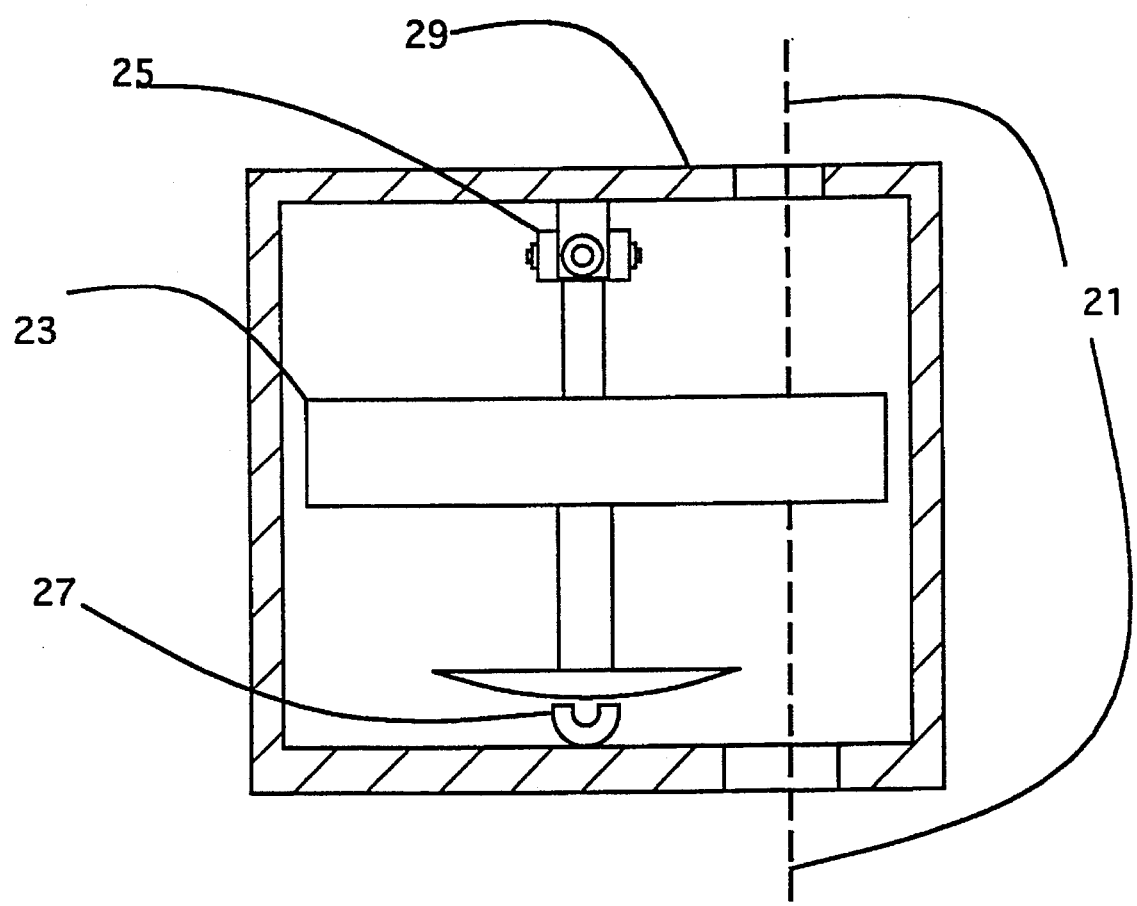
Figure 5:
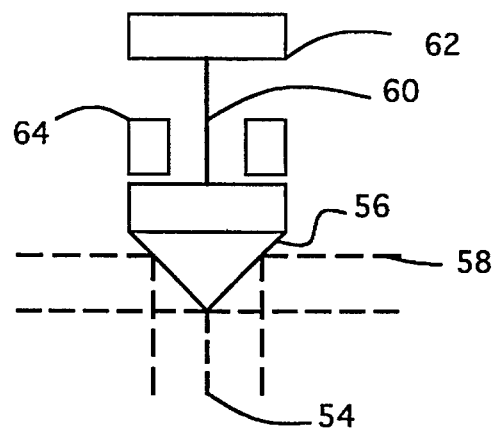
Figure 6A:
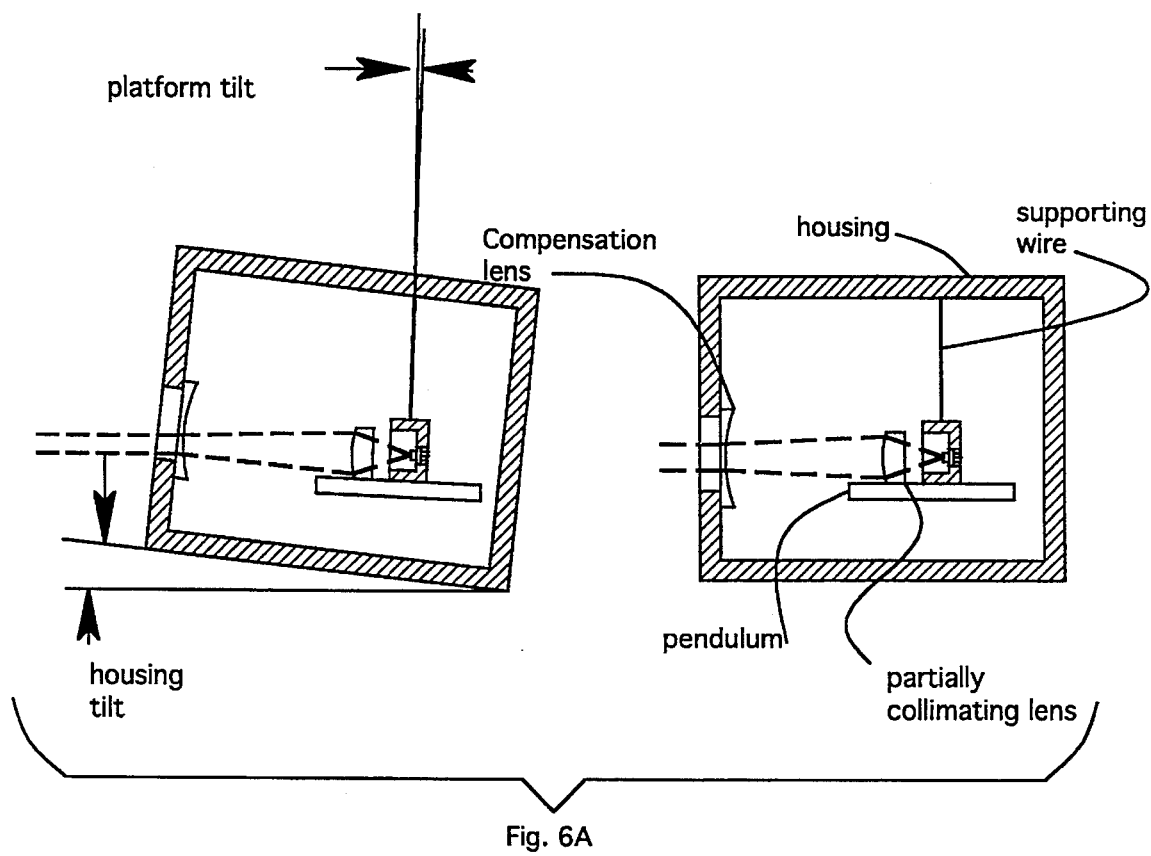
FIG. 6A is a simplified drawing of the present invention showing the combination of the weak optical correction and very flexible wire self-leveling means.
Figure 6B:
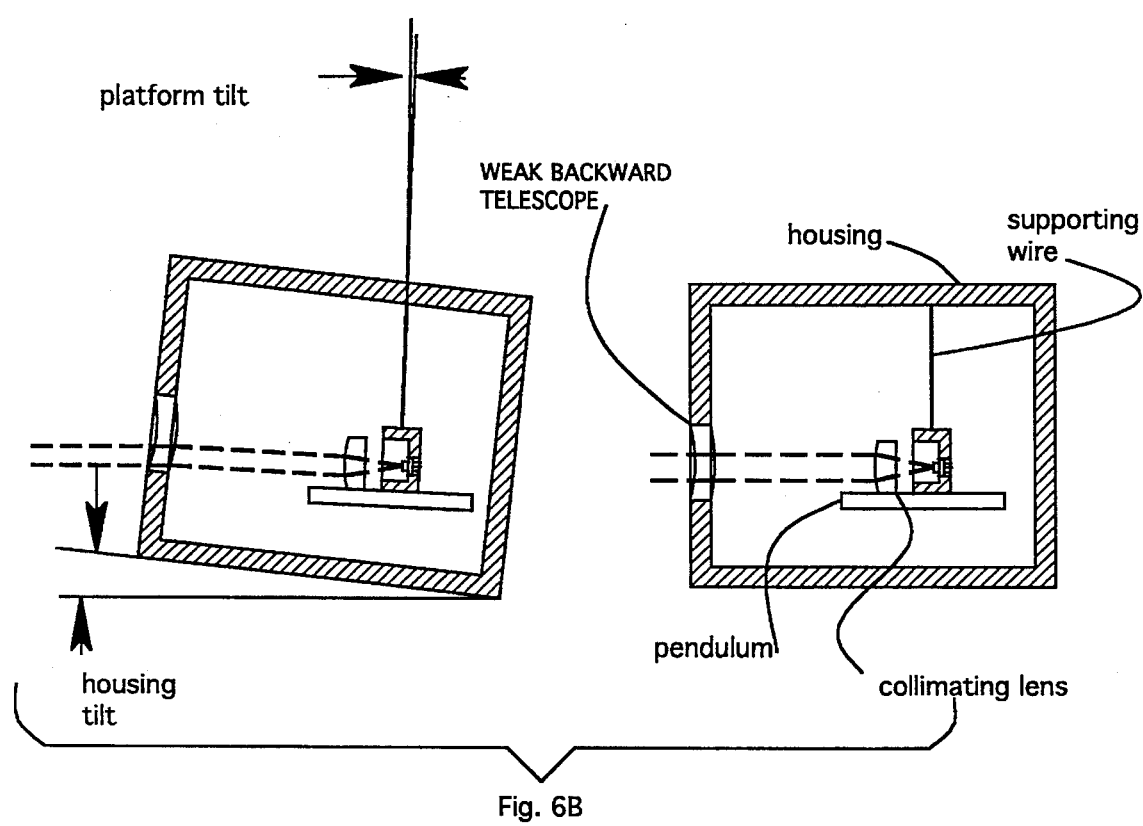
FIG. 6B is a simplified drawing of the present two-stage leveling showing the combination of weak reverse telescope and very flexible wire.

The term "weak lens means" as used in the claims is intended to refer to a weak negative lens (as in FIGS. 7A and 7B, for example) as a correcting optical element or a weak reverse telescope (as in FIGS. 6B and 19, for example) as a correcting optical element. In either case the weak lens means provides correction of the beam's alignment, in a second stage of alignment, to substantially truly level and/or plumb orientation. In the case of a weak negative lens, this element also affects the focus of the emerging beam; in the case of a telescope it does not.

The above described preferred embodiments are intended to illustrate the principles of the invention, not to limit its scope. Other embodiments in variations to these preferred embodiments will be apparent to those skilled in the art and may be made without departing from the spirit and scope of the invention as defined in the following claims.

We claim:

1. A portable hand tool for projecting a laser beam in level or plumb direction, in spite of a tilted condition of the tool itself, to align the projected laser beam in two stages to substantially truly level or plumb orientation, comprising:

a housing, laser means with projection means for projecting a primary laser beam, pendulous mounting means secured to the housing and depending internally in the housing, including a platform, for effecting a first stage of alignment when the housing is not truly level or plumb, by tilting the platform angularly relative to the housing as induced by tilt of the housing, said laser means being mounted on the platform of the pendulous mounting means such that the projected primary beam from the laser means changes in angular relationship to the housing and is aligned to nearly level or plumb orientation when the housing is tilted, leaving a small angle of deviation of the primary laser beam from a truly level or plumb orientation, and weak lens means secured to the housing and positioned in the path of the primary laser beam, in a second stage of alignment, having a position and optics selected for aligning the laser beam to substantially truly level or plumb orientation as a final laser beam, by bending the path of the primary laser beam by said small angle of deviation.

2. The portable hand tool of claim 1, wherein the laser means comprises a laser diode mounted substantially horizontally on the pendulous mounting means.

3. The hand tool of claim 1, wherein the laser means comprises a laser diode, and the tool including a laser power supply in the housing and at least one fine wire extending from the power supply to the laser diode, the fine wire comprising a separate element from the pendulous mounting means and being sufficiently fine and flexible and of sufficient length so as not to interfere with the aligning function of the pendulous mounting means when the housing is tilted.

4. The hand tool of claim 1, wherein the housing includes adjustable lens mounting means securing said weak lens means to the housing, for permitting lateral adjustment of the weak lens means, in a direction generally perpendicular to the path of the laser beam, for calibration of the instrument.

5. The hand tool of claim 1, wherein the pendulous mounting means includes center of gravity adjustment means, comprising a weight secured to the pendulous mounting means and adjustable in position so as to shift the center of gravity of the pendulous mounting means.

6. The hand tool of claim 5, wherein the center of gravity adjustment means comprises a pair of screws oriented in different directions, each adjustable as to position by rotation of the screw.

7. The hand tool of claim 1, further including motion limiting means secured to the housing for limiting the angle within which the pendulous mounting means can swing within the housing and for limiting translation movement of the pendulous mounting means in the housing, for protection of the pendulous mounting means against damage.

8. The hand tool of claim 1, further including means for preventing axial shock damage to the pendulous mounting means in the event the tool is dropped or subjected to other potentially damaging impact, comprising a spring mounting means securing the upper end of the pendulous mounting means to the housing.

9. The hand tool of claim 8, further including up/down motion limiting means acting between the pendulous mounting means and the housing, for limiting the amount of vertical motion the pendulous mounting means is permitted via the spring mounting means during impact on the tool.

10. The hand tool of claim 8, wherein the spring mounting means comprises a leaf spring secured at its ends to the housing and at its middle to the pendulous mounting means.

11. The hand tool of claim 1, wherein the pendulous mounting means has a stiffness in the range of about ½ percent to 2 percent as measured by the ratio between said small angle of deviation and the angle of tilt of the housing.

12. The hand tool of claim 11, wherein the stiffness of the pendulous mounting means is in the range of about 1 percent to 2 percent.

13. The hand tool of claim 1, further including an internal battery and laser power supply within the housing, with external switch means enabling connection of the battery to the laser power supply.

14. The hand tool of claim 1, further including magnetic damping means positioned to coact between the housing and the pendulous mounting means.

15. The hand tool of claim 1, wherein the pendulous mounting means comprises a single wire of selected stiffness mounted generally vertically in the housing.

16. The hand tool of claim 1, wherein the pendulous mounting means comprises a coil spring with an upper end fixed to the housing.

17. The hand tool of claim 1, further including means within the housing for producing two orthogonal laser beams exiting the housing, one plumb and one level.

18. The hand tool of claim 17, wherein the means for producing two orthogonal laser beams comprises a beam splitter mirror mounted on the pendulous mounting means, and a pair of said weak lens means secured to the housing, one positioned in the path of a beam projected horizontally, i.e. the level beam, and the other in the path of a beam projected vertically, i.e. the plumb beam.

19. The hand tool of claim 18, wherein the laser means includes optical means for producing a slightly converging laser beam projected from the pendulous mounting means, the degree of convergence of the laser beam being such that the beam will be corrected to parallel by said weak lens means, which comprises a pair of weak negative lenses, and the converging laser beam being split by said beam splitter mirror en route to each said weak negative lens.

20. The hand tool of claim 18, wherein the laser means includes optical means for producing a substantially fully collimated laser beam projected from the pendulous mounting means, and the collimated laser beam being split by said beam splitter means en route to each said weak lens means, which each comprise weak reverse telescopes.

21. The hand tool of claim 1, wherein the weak lens means comprises a weak negative lens, and wherein the laser means includes optical means for producing a slightly converging laser beam projected from the pendulous mounting means, the degree of convergence of the laser beam being such that the beam will be corrected to parallel by said weak negative lens.

22. The hand tool of claim 1, wherein the laser means includes optical means for producing a substantially fully collimated laser beam projected from the pendulous mounting means, and wherein said weak lens means comprises a weak reverse telescope.

23. The hand tool of claim 1, wherein the pendulous mounting means comprises a coil spring with an upper end fixed to the housing, the coil spring having reverse wound coils with substantially an upper half of the coils oriented in a first direction and a lower half of the coils oriented in the opposite direction, whereby the position of the pendulous mounting means is rotationally stable even under changing temperature conditions causing thermal expansion and contraction of the spring.

24. The hand tool of claim 23, wherein the pendulous mounting means has an upper end and wherein at least one electrical conductor wire from the laser means extends to a position secured to the upper end of the pendulous mounting means, and wherein at least one fine wire extends from the electrical conductor wire at the upper end of the pendulous mounting means, and wherein at least one fine wire extends from the electrical conductor wire at the upper end of the pendulous mounting means to a fixed position on the housing, said fine wire being generally laterally adjacent and close to the coil spring, so that minimal bending of the fine wire is required when the pendulous mounting means tilts relative to the housing to correct the laser beam.

25. The hand tool of claim 1, wherein the tool has an accurate operating range, and wherein the housing has a supporting base with a bottom surface positioned to rest against a floor or other horizontal surface, the bottom surface being of a dimension that the tool will tip over if the tilt of the floor exceeds the accurate operating range of the tool.

26. The hand tool of claim 1, wherein the weak lens means comprises a weak negative lens.

27. A portable hand tool for projecting a level plane of laser light, in spite of a tilted condition of the tool itself to align the projected laser plane in two stages to substantially level orientation, comprising:

a housing, laser means with projection means for projecting a primary laser beam, pendulous mounting means secured to the housing and depending internally in the housing, including a platform, for providing a first stage of alignment when the housing is not truly level or plumb, by tilting the platform angularly relative to the housing as induced by tilt of the housing, said laser means being mounted on the platform of the pendulous mounting means such that the projected primary beam from the laser means changes in angular relationship to the housing and is mostly aligned to nearly plumb orientation when the housing is tilted, leaving a small angle of deviation of the primary laser beam from truly plumb orientation, axicon reflector means fixed to the platform of the pendulous mounting means and in the path of the projected primary beam from the laser means, for producing generally a plane of laser light from the projected primary base, and weak toroidal lens means secured to the housing and positioned in the path of the plane of laser light in a second stage of alignment, having optics selected for aligning the plane of laser light to substantially truly level orientation, by bending the path of the plane laser light by said small angle of deviation.

28. The hand tool of claim 27, wherein the axicon reflector means comprises a reflector cone, and wherein the laser means includes means for directing a generally parallel beam of laser light at the reflector cone to produce a plane of light which is approximately parallel, and wherein the weak toroidal lens means comprises a weak reverse telescope.

29. The hand tool of claim 27, wherein the axicon reflector means has a negatively curved reflecting surface, and wherein the laser means includes optics for producing a diverging beam of laser light as said projected laser beam, the concave reflector serving to focus the beam toward parallel.

30. The hand tool of claim 29, wherein the concave axicon reflector has a curvature such as to produce a slightly converging plane of laser light, said weak toroidal lens means comprising a weak negative lens having a focal length selected to adjust the plane of light to substantially parallel emerging from the tool.

* * * * *